(12) United States Patent
Sakano et al.

(10) Patent No.: US 10,670,788 B2
(45) Date of Patent: Jun. 2, 2020

(54) LIGHT DIFFUSION FILM LAMINATE FOR REFLECTIVE DISPLAY DEVICE AND REFLECTIVE DISPLAY DEVICE INCLUDING THE SAME

(71) Applicant: TOMOEGAWA CO., LTD., Tokyo (JP)

(72) Inventors: Tsubasa Sakano, Shizuoka (JP); Masahide Sugiyama, Shizuoka (JP)

(73) Assignee: TOMOEGAWA CO., LTD., Tokyo (JP)

( * ) Notice: Subject to any disclaimer, the term of this patent is extended or adjusted under 35 U.S.C. 154(b) by 0 days.

(21) Appl. No.: 16/332,011

(22) PCT Filed: Jul. 24, 2017

(86) PCT No.: PCT/JP2017/026678
§ 371 (c)(1),
(2) Date: Mar. 11, 2019

(87) PCT Pub. No.: WO2018/051639
PCT Pub. Date: Mar. 22, 2018

(65) Prior Publication Data
US 2019/0204488 A1 Jul. 4, 2019

(30) Foreign Application Priority Data

Sep. 14, 2016 (JP) .................. 2016-179795

(51) Int. Cl.
*G02B 5/30* (2006.01)
*G02F 1/1335* (2006.01)
*G02B 5/02* (2006.01)
*G02F 1/13357* (2006.01)

(52) U.S. Cl.
CPC ......... *G02B 5/3033* (2013.01); *G02B 5/0257* (2013.01); *G02B 5/0284* (2013.01);
(Continued)

(58) Field of Classification Search
None
See application file for complete search history.

(56) References Cited

U.S. PATENT DOCUMENTS

2003/0103177 A1   6/2003 Maeda et al.
2006/0204744 A1*  9/2006 Hiraishi .............. G02B 5/0231
                                                    428/327
(Continued)

FOREIGN PATENT DOCUMENTS

JP   2002-122714 A   4/2002
JP   2004-102305 A   4/2004
(Continued)

OTHER PUBLICATIONS

Translation of International Preliminary Report on Patentability for PCT/JP2017/026678 dated Mar. 28, 2019.

*Primary Examiner* — Ryan Crockett
(74) *Attorney, Agent, or Firm* — Muncy, Geissler, Olds & Lowe, P.C.

(57) ABSTRACT

Provided is a light diffusion film laminate for a reflective display device that can improve the reflection luminance at a predetermined observation position (for example, the front direction of the screen) without reducing the visibility not only from the predetermined observation position (for example, the front direction of the screen) but also from a position away from a predetermined observation position (for example, an oblique direction deviated from the front of the screen) and a reflective display device including the light diffusion film laminate.

A light diffusion film laminate for a reflective display device has optical diffusibility that changes depending on an incident angle of light, and at least transmits reflected light occurring when incident light is reflected by a reflective layer. The light diffusion film laminate includes at least an anisotropic light diffusion layer that has a scattering central (Continued)

axis and whose linear transmittance changes depending on an incident light angle of the light, wherein the anisotropic light diffusion layer has a matrix region and a plurality of pillar structures, wherein an angle of the scattering central axis is in a range of +6° or more and +40° or less, or −40° or more and −6° or less with respect to a normal direction of the anisotropic light diffusion layer, and an isotropic light diffusion layer disposed on one surface of the anisotropic light diffusion layer.

17 Claims, 7 Drawing Sheets

(52) U.S. Cl.
CPC ...... *G02F 1/1335* (2013.01); *G02F 1/133553* (2013.01); *G02F 1/133606* (2013.01)

(56) References Cited

U.S. PATENT DOCUMENTS

| | | | |
|---|---|---|---|
| 2007/0291366 A1 | 12/2007 | Murata | |
| 2015/0338698 A1* | 11/2015 | Sugiyama | G02F 1/133504 349/112 |
| 2016/0018571 A1* | 1/2016 | Kusama | G02B 5/0236 428/220 |
| 2016/0033692 A1* | 2/2016 | Kusama | G02B 5/0236 359/599 |
| 2016/0047952 A1* | 2/2016 | Kusama | G02B 5/0236 252/582 |
| 2016/0116646 A1* | 4/2016 | Araki | G02B 6/0051 349/112 |
| 2016/0327697 A1* | 11/2016 | Sugiyama | G02B 5/0236 |
| 2017/0192137 A1* | 7/2017 | Sakano | B05D 7/04 |
| 2017/0293054 A1* | 10/2017 | Kusama | G02B 5/0236 |
| 2019/0302327 A1* | 10/2019 | Murata | G02F 1/133504 |
| 2020/0026120 A1* | 1/2020 | Kato | G02B 5/02 |

FOREIGN PATENT DOCUMENTS

| | | |
|---|---|---|
| JP | 2006-119241 A | 5/2006 |
| JP | 2009-116126 A | 5/2009 |
| JP | 2015-127819 A | 7/2015 |
| WO | 2015/146708 A1 | 10/2015 |

* cited by examiner

LIGHT DIFFUSION FILM LAMINATE FOR REFLECTIVE DISPLAY DEVICE AND REFLECTIVE DISPLAY DEVICE INCLUDING THE SAME

TECHNICAL FIELD

The present invention relates to a light diffusion film laminate for a reflective display device and a reflective display device including the light diffusion film laminate.

BACKGROUND ART

In recent years, a display device that performs reflective display (hereinafter referred to as "reflective display device") is used for electronic paper and the like. Here, the reflective display is a display method in which an external light is reflected to display an image, and examples thereof include a reflective liquid crystal display method, a cholesteric liquid crystal display method, an electrowetting display method, an electrophoretic display system, and an electronic liquid powder display system and the like.

Compared with a transmissive display device having a backlight, the reflective display device has the low power consumption since it does not have a backlight. In addition, compared with a self-luminous display device such as an EL (Electro Luminescence) display, the reflective display device is further advantageous in low power consumption since it has an image holding memory property. In addition, since a sharp image can be visually recognized on the reflective display device without deterioration of visibility under strong external light such as sunlight, which is the biggest disadvantage of the transmissive display device and the self-luminous display device, the device is excellent in the conditions under which it is used outdoors. On the other hand, there is a feature that it is difficult to obtain high reflection luminance under a limited external light such as indoors and the visibility is deteriorated.

When a user (observer) using the reflective display device views the screen with a reflective display device, for example, a tablet terminal or the like, the user (observer) basically views the tablet terminal in a manner that the user (observer) and the tablet terminal or the like face each other according to the user (observer) posture.

Further, in the reflective display device, conventionally, since visibility is easily influenced by the intensity of external light, it is common to provide a diffusion layer (diffusion film) capable of improving the reflectance of light. For example, provided is a device in which a diffusion layer (diffusion film) is arranged on the viewing side of a display device (for example, Patent Literature 1).

CITATION LIST

Patent Literature

Patent Literature 1: JP 2004-102305 A

SUMMARY OF INVENTION

Technical Problem

The user (observer) does not face the tablet terminal or the like at all times, and for example, the user (observer) may see it from the oblique direction of the screen as the user (observer) posture changes. At this time, naturally, the incident light angle of external light also changes. Also, when the user (observer) faces the tablet terminal or the like, it is desirable to increase the reflection luminance in the front direction of the screen. However, sufficient display quality cannot be obtained in a reflective display device having a conventional diffusion layer (diffusion film).

The present invention has been made in view of the above circumstances, and an object of the present invention is to provide a light diffusion film laminate for a reflective display device that is excellent in display quality and which can improve the reflection luminance at a predetermined observation position (for example, the front direction of the screen) without reducing the visibility not only from the predetermined observation position (for example, the front direction of the screen) but also from a position away from a predetermined observation position (for example, an oblique direction deviated from the front of the screen).

Solution to Problem

In order to solve the above-mentioned problems a light diffusion film laminate for a reflective display device according to the present invention has optical diffusibility that changes depending on an incident angle of light, and at least transmits reflected light occurring when incident light is reflected by a reflective layer. The light diffusion film laminate includes at least an anisotropic light diffusion layer that has a scattering central axis and whose linear transmittance changes depending on an incident light angle of the light, wherein the anisotropic light diffusion layer has a matrix region and a plurality of pillar structures, wherein an angle of the scattering central axis is in a range of $+6°$ or more and $+40°$ or less, or $-40°$ or more and $-6°$ or less with respect to a normal direction of the anisotropic light diffusion layer, and an isotropic light diffusion layer disposed on one surface of the anisotropic light diffusion layer.

Advantageous Effect of Invention

According to the present invention, it is possible to provide a light diffusion film laminate for a reflective display device that can improve the reflection luminance at a predetermined observation position (for example, the front direction of the screen) without reducing the visibility not only from the predetermined observation position (for example, the front direction of the screen) but also from a position away from a predetermined observation position (for example, an oblique direction deviated from the front of the screen).

MODE FOR CARRYING OUT THE INVENTION

Figure 1:
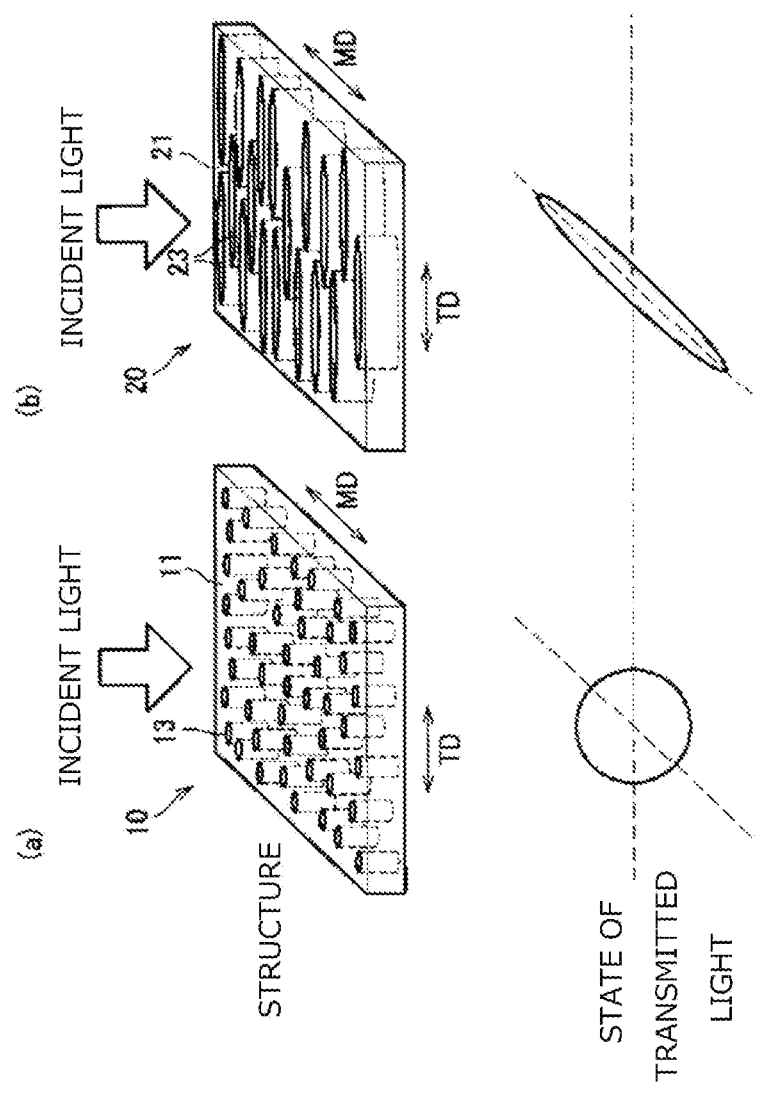
FIG. 1 is schematic diagram showing an example of the structures of anisotropic optical films (anisotropic light diffusion layer) having a pillar region of a columnar structure and a pillar region of a tabular structure according to this embodiment and the state of transmitted light incident into these anisotropic optical films.

Hereinafter, embodiments will be described in detail in the following order with reference to the drawings.
0. Definition of Major Terms
1. Structure and Characteristics of Anisotropic Optical Film
  1-1. Basic Structure of Anisotropic Optical Film
  1-2. Characteristics of Anisotropic Optical Film
2. Configuration of Anisotropic Optical Film
  2-1. Overall configuration
  2-2. Anisotropic Light Diffusion Layer 110
  2-2-1. Pillar Structure 113
  2-3. Anisotropic Light Diffusion Layer 120
  2-3-1. Pillar Structure 123
  2-4. Aspect Ratio of Pillar Structure 113 and Pillar Structure 123
  2-4-1. Average Short diameter and Average Long diameter of Pillar Structure 113 and Pillar Structure 123
  2-5. Thickness of Region Where Pillar Structures 113 and 123 Are Formed
  2-6. Properties of Anisotropic Optical Film 100
  2-6-1. Linear transmittance
  2-6-2. Diffusion Width
  2-6-3. Scattering Central Axis
  2-6-4. Refractive Index
3. Isotropic Light Diffusion Layer 200
  3-1. Resin Base Material
  3-2. Fine Particles and Other Components
  3-3. Refractive Index
  3-4. Average Particle Diameter
  3-5. Content
  3-6. Haze Value
  3-7. Total Light Transmittance
4. Arrangement Configuration of Anisotropic Optical Film 100 and Isotropic Light Diffusion Layer 200 (Light Diffusion Film Laminate 30)
5. Reflective Display Device
6. Example 0. Definition of Major Terms Here, main terms of the anisotropic optical film (anisotropic light diffusion layer) are defined.

The term anisotropic optical film includes a film of a single anisotropic light diffusion layer (only one layer), or a film in which two or more anisotropic light diffusion layers are laminated (in this case, an adhesive layer may be laminated between the anisotropic light diffusion layers), and others. Therefore, for example, when the anisotropic light diffusion layer is a single layer, the anisotropic light diffusion layer of the single layer is an anisotropic optical film.

The anisotropic optical film has anisotropy and directivity to have dependency on incident light angle in which the light diffusion, transmission, and diffusion distribution change depending on the incident angle of light (details will be described later). Therefore, it is different from the directivity diffusion film which does not depend on incident light angle, the isotropic diffusion film, and the diffusion film oriented in a specific direction.

The low refractive index region and the high refractive index region are regions formed by the high/low difference in the local refractive index of the material constituting the anisotropic optical film according to the present invention, and are relative, indicating whether one region has the low or high refractive index, compared with the other. These regions are formed when the material of the anisotropic optical film cures.

The scattering central axis means a direction in which the light diffusibility coincides with the incident light angle at which light diffusibility has a substantially symmetric property when changing the incident light angle to the anisotropic optical film. Use of "substantial" for the symmetric property means that the optical profile (described later) with respect to light diffusibility is not symmetrical in strict meaning when the scattering central axis has an inclination with respect to the normal direction of the film (film thickness direction of the film). The scattering central axis can be seen by observing the slope of the cross section of the anisotropic optical film with an optical microscope or observing the projection shape of the light via the anisotropic optical film by changing the incident light angle.

In addition, the linear transmittance generally refers to linear transmitting property of light incident into an anisotropic optical film, and the ratio of the transmitted light quantity in the linear direction to the light quantity of the incident light when light enters the film at a certain incident light angle, and is expressed by the following expression.

Linear transmittance(%)=(linear transmitted light quantity/incident light quantity)×100

Further, in the present invention, both the scattering and the diffusion are used without distinction, and both have the same meaning. Furthermore, the meaning of the photopolymerization and the photocuring is that the photopolymerizable compound undergoes polymerization reaction by light, and both are used synonymously.

Hereinafter, preferred embodiments of the present invention will be described in detail with reference to the drawings. In this specification and the drawings, constituent elements given the same reference numerals have substantially the same structure or function.

1. Structure and Characteristics of Anisotropic Optical Film

With reference to FIGS. 1 to 4, as a premise to explain about the anisotropic optical film according to the present embodiment, the structure and the characteristics of an anisotropic optical film of a single layer (an anisotropic optical film of a single anisotropic light diffusion layer in the present embodiment) according to the prior art will be described.

Figure 2:
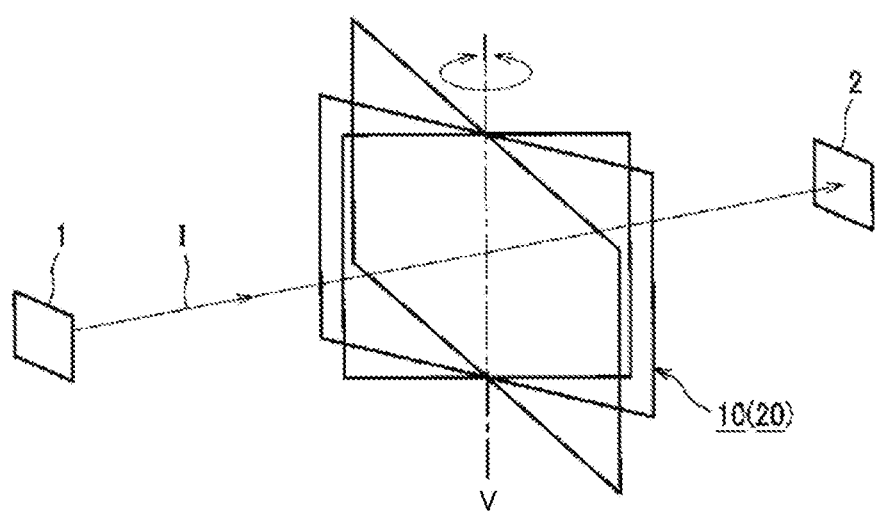
FIG. 2 is an explanatory view showing a method of evaluating the light diffusibility of the anisotropic optical film according to this embodiment.
Figure 3:
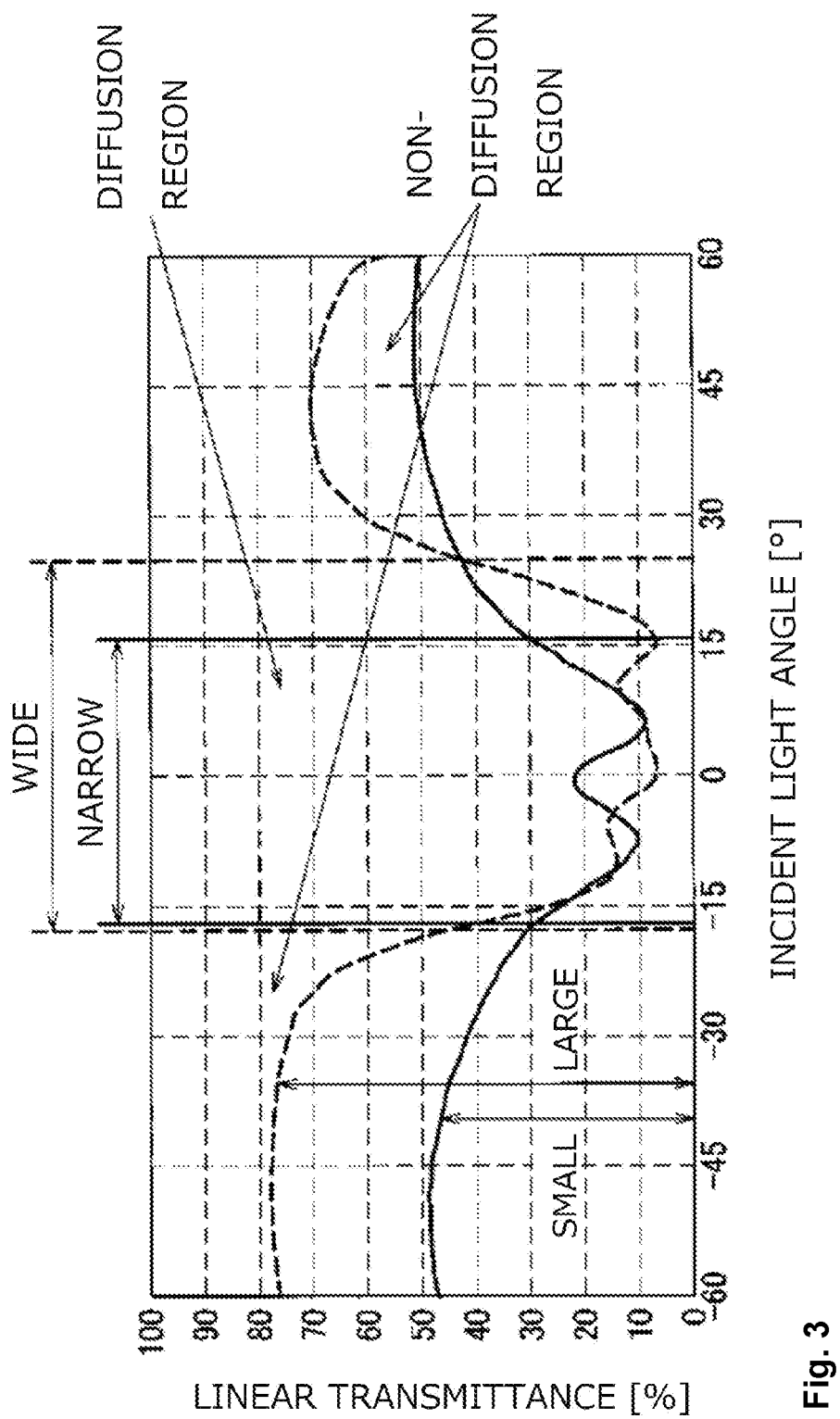
FIG. 3 is a graph showing a relationship between an incident light angle and a linear transmittance to anisotropic optical films (anisotropic light diffusion layer) having a columnar structure and a tabular structure shown in FIG. 1 according to the present embodiment.
Figure 4:
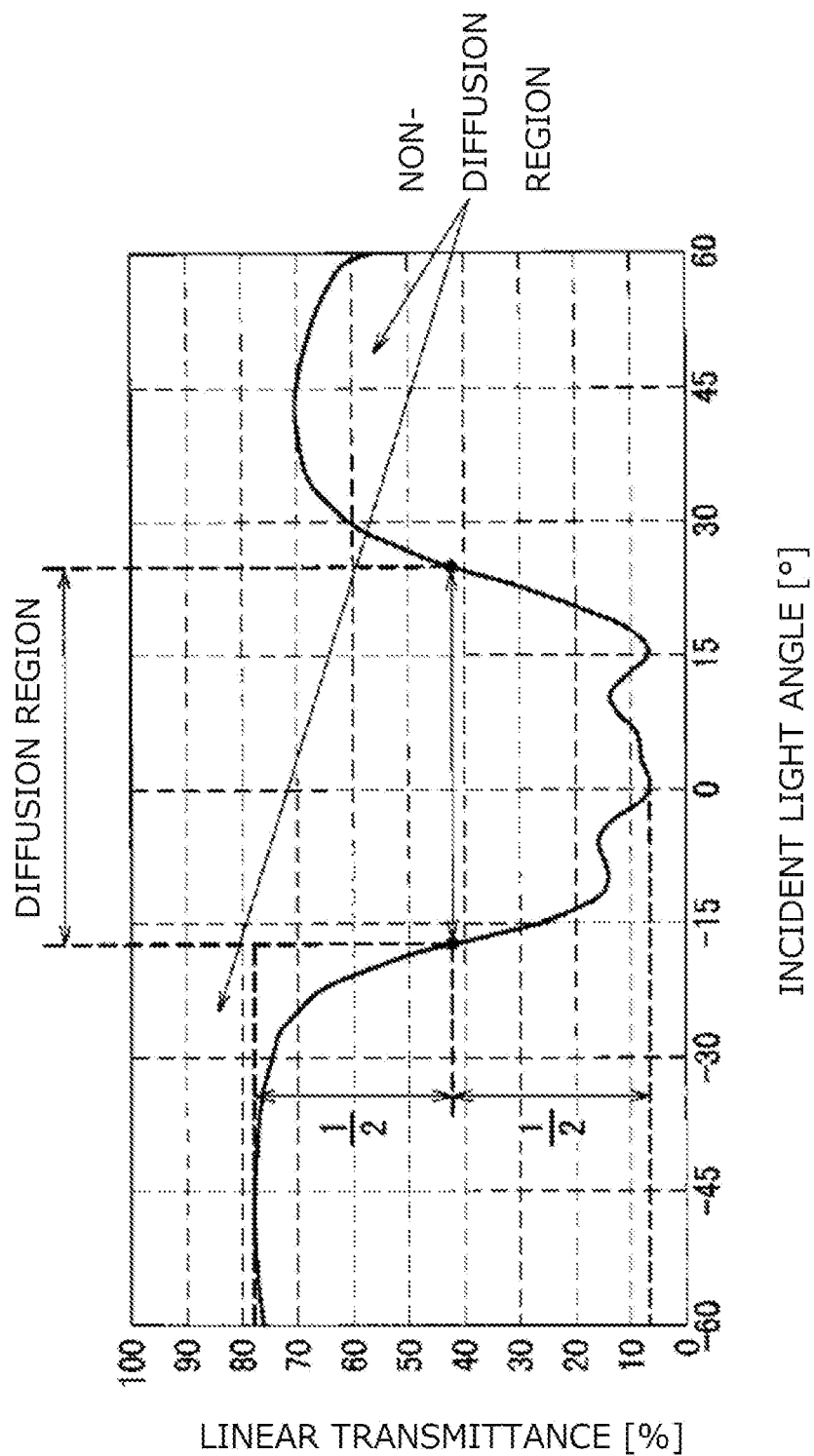
FIG. 4 is a graph for explaining a diffusion region and a non-diffusion region according to the present embodiment.

FIG. 1 is a schematic diagram showing an example of the structures of single-layer anisotropic optical films having a pillar region of a columnar structure and a pillar region of a tabular structure and the state of transmitted light incident into these anisotropic optical films. FIG. 2 is an explanatory view showing a method of evaluating the light diffusibility of the anisotropic optical film. FIG. 3 is a graph showing a relationship between an incident light angle and a linear transmittance to anisotropic optical films having a columnar structure and a tabular structure shown in FIG. 1. FIG. 4 is a graph for explaining a diffusion region and a non-diffusion region.

<<1-1. Basic Structure of Anisotropic Optical Film>>

A region having a refractive index different from that of the matrix region of the film is formed in the film thickness direction (normal direction) in the anisotropic optical film. The shape of the regions having different refractive indexes is not particularly limited. The shape includes, for example, as shown in FIG. 1(a), an anisotropic optical film 10 (anisotropic optical film having a columnar structure) in which a plurality of pillar structures 13 (pillar regions) with different refractive indexes formed in a pillar shape (for example, a bar shape) having a small aspect ratio consisting of a long diameter and a short diameter are formed in a matrix region 11, as shown in FIG. 1(b), an anisotropic optical film 20 (an anisotropic optical film having a tabular structure) in which a plurality of pillar structures 23 (pillar regions) having different refractive indexes formed in a pillar shape (for example, substantially plate-like) having a large aspect ratio are formed in a matrix region 21, and the like.

<<1-2. Characteristics of Anisotropic Optical Film>>

The anisotropic optical film having the above structure is a light diffusion film having different light diffusibility depending on the incident light angle to the film, that is, a light diffusion film having dependency on incident light angle. When light incident into the anisotropic optical film at a predetermined incident light angle is substantially parallel to the orientation direction of the regions with different refractive indexes (for example, the direction (orientation direction) in which the plurality of pillar structures 13 in the columnar structure extend, and the height direction (film thickness direction or normal direction of the anisotropic optical film) of the plurality of columnar structures 23 in the tabular structure)), priority is given to diffusion, and when it is not parallel to the orientation direction, priority is given to transmission.

Here, with reference to FIGS. 2 and 3, the light diffusibility of the anisotropic optical film will be described more specifically. Here, explanation will be given by exemplifying the light diffusibility of the anisotropic optical film 10 having the pillar structure and the anisotropic optical film 20 having the tabular structure.

The light diffusibility evaluation is performed as follows. First, as shown in FIG. 2, the anisotropic optical film 10, 20 is arranged between a light source 1 and a detector 2. In the present embodiment, the incident light angle at which irradiation light I from the light source 1 enters from the normal direction of the plane of the anisotropic optical film 10, 20 is set as 0°. In addition, the anisotropic optical film 10, 20 is disposed so as to be rotatable at any angle around a straight line V, and the light source 1 and the detector 2 are fixed. That is, according to this method, a sample (anisotropic optical film 10, 20) is placed between the light source 1 and the detector 2, and it is possible to measure the linear transmittance that passes straight through the sample and enters the detector 2 while the angle is changed around the straight line V on the sample surface as the central axis.

The light diffusibility of the anisotropic optical film 10, 20 is evaluated when the TD direction (axis in the width direction of the anisotropic optical film) of FIG. 1 is selected as the straight line V of the rotation center shown in FIG. 2, and the evaluation result of the obtained light diffusibility is shown in FIG. 3. FIG. 3 shows the dependency on incident light angle of the light diffusibility (light scattering characteristic) of the anisotropic optical film 10, 20 shown in FIG. 1 measured by the method shown in FIG. 2. The vertical axis in FIG. 3 represents the linear transmittance, which is an index indicating the degree of scattering, (in the present embodiment, the ratio of the light quantity of parallel rays emitted in the same direction as the incident direction to a predetermined light quantity of the parallel rays which are incident, more specifically, the linear transmittance=(the quantity of light detected by the detector 2 when the anisotropic optical film 10, 20 is present (transmitted light quantity in the linear direction of the incident light)/the quantity of light detected by the detector 2 when the anisotropic optical film 10, 20 is not present (the light quantity of the incident light))×100, where the horizontal axis shows the incident light angle to the anisotropic optical film 10, 20. The solid line in FIG. 3 shows the light diffusibility of the anisotropic optical film 10 of the columnar structure, and the broken line shows the light diffusibility of the anisotropic optical film 20 of the tabular structure. The positive and negative of the incident light angle indicates that the anisotropic optical film 10, 20 is rotated in the opposite directions.

As shown in FIG. 3, the anisotropic optical film 10, 20 has dependency on incident light angle of light diffusibility in which the linear transmittance changes depending on the incident light angle. Here, the curved line showing dependency on incident light angle of the light diffusibility as shown in FIG. 3 is hereinafter referred to as an optical profile. The optical profile does not directly express the light diffusibility. However, the decrease in the linear transmittance may increase the diffuse transmittance, so that it can be said that the optical profile generally indicates the light diffusibility. In other words, as the linear transmittance decreases, the diffuse transmittance of the incident light increases. Specifically, in the anisotropic optical film 10, 20, assuming that the incident light angle in the direction of the scattering central axis of the pillar region 13, 23 is 0°, the linear transmittance shows a valley type optical profile in which the linear transmittance is relatively lowered, and has a minimum value at an incident light angle of −20° to +20°, and the linear transmittance increases as (the absolute value of) the incident light angle increases, and has a maximum value at an incident light angle of −60° to −30° or +30° to +60°. As described above, the anisotropic optical film 10, 20 has properties in which incident light is strongly diffused in the incident light angle range of −20° to +20° close to the scattering central axis direction, but the diffusion is weakened and the linear transmittance is increased in the range of the incident light angle in which the absolute value of the incident light angle is larger than the above range is.

Here, as shown in FIG. 3, properties (optical profile), in which light diffusion is given priority in a certain angle range and in which light transmission is given priority in another angle range, are referred to as anisotropy. That is, the diffusion and the transmission of light change depending on the incident light angle of light.

Also, the properties in which the light diffusion distribution differs depending on the diffusion angle is referred to as directivity. In the present invention, the diffusion distribution of light not only differs depending on diffusion angle, but also has further dependency on incident light angle in which the diffuse distribution changes depending on the incident light angle of light. That is, the diffuse distribution of light represent anisotropy and directivity to have dependency on incident light angle in which the light diffusion, transmission and diffusion distribution change depending on the incident angle of light.

In the following, the angle range between the two incident light angles with respect to the linear transmittance of the intermediate value between the maximum linear transmittance and the minimum linear transmittance is referred to as a diffusion region (the width of this diffusion region is referred to as diffusion width), and the incident light angle range other than the diffusion region is referred to as a non-diffusion region (transmission region).

Here, with reference to FIG. 4, the diffusion region and the non-diffusion region will be described by taking the anisotropic optical film 20 of the tabular structure as an example. FIG. 4 shows the optical profile of the anisotropic optical film 20 having the tabular structure shown in FIG. 3. As shown in FIG. 4, the incident light angle range between two incident light angles (inside the two incident light angles at the positions of the two black dots on the optical profile shown in FIG. 4) with respect to the linear transmittance of the intermediate value (in the example of FIG. 4, the linear transmittance is about 42%) between the maximum linear transmittance (in the example of FIG. 4, the linear transmittance is about 78%) and the minimum linear transmittance (in the example of FIG. 4, the linear transmittance is about 6%) corresponds to the diffusion region (diffusion of light is given priority), and the incident light angle range other than the above (outside the two incident light angles at the positions of the two black dots on the optical profile shown in FIG. 4) corresponds to a non-diffusion region (priority is given to light transmission).

In the anisotropic optical film 10 having a columnar structure, as can be seen from the state of transmitted light in FIG. 1(a), the transmitted light has a substantially circular shape, and substantially the same light diffusibility in the MD direction and the TD direction. That is, for the anisotropic optical film 10 having a columnar structure, the diffusion has azimuthally isotropy. Further, as shown by the solid line in FIG. 3, even if the incident light angle is changed, since the change in the light diffusibility (in particular, the optical profile in the vicinity of the boundary between the non-diffusion region and the diffusion region) is relatively gentle, there is an effect in which discomfort due to an abrupt change in luminance does not occur. However, as can be understood from comparison with the optical profile of the anisotropic optical film 20 having the tabular structure shown by the broken line in FIG. 3, since the linear transmittance in the non-diffusion region is low in the anisotropic optical film 10, there is a problem that display characteristics (luminance, contrast, etc.) are slightly lowered. In addition, the anisotropic optical film 10 of the columnar structure also has a problem that the width of the diffusion region is narrow, compared with the anisotropic optical film 20 of the tabular structure. Note that the columnar structure has no directivity of diffusion by the azimuth angle, but it has directivity with respect to the distribution of diffusion.

On the other hand, for the anisotropic optical film 20 having the tabular structure, as can be seen from the state of the transmitted light in FIG. 1(b), the transmitted light has a substantially needle-like shape, and the light diffusibility in the MD direction is greatly different from that in the TD direction. That is, for the anisotropic optical film 20 having the tabular structure, the diffusion has directivity in which the diffusion characteristics are greatly different depending on the azimuth angle. Specifically, in the example shown in FIG. 1, while the diffusion in the tabular structure is wider than that in the columnar structure in the MD direction, the diffusion in the tabular structure is narrower than that in the columnar structure in the TD direction. Further, as indicated by a broken line in FIG. 3, when the incident light angle is changed, since the change in the light diffusibility (in particular, the optical profile in the vicinity of the boundary between the non-diffusion region and the diffusion region) is extremely steep (in the TD direction in the present embodiment), when the anisotropic optical film 20 is applied to a display device, an abrupt change in luminance appears, which may cause discomfort. In addition, the anisotropic optical film of the tabular structure has a problem that light interference (rainbow) is likely to occur. However, for the anisotropic optical film 20, there is an effect that the linear transmittance in the non-diffusion region is high and the display characteristics can be improved. In particular, the direction of diffusion (MD direction in FIG. 1(b)) to which priority is given is made to coincide with the direction in which it is desired to widen the viewing angle, so that it is possible to widen the viewing angle in the intended specific direction.

2. Configuration of Anisotropic Optical Film

Figure 5:
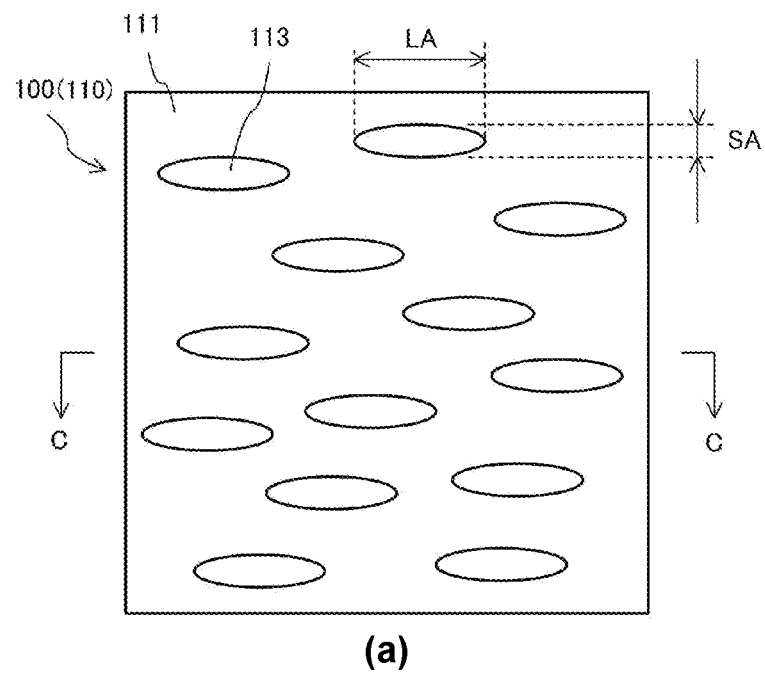
FIG. 5 is a schematic diagram showing a configuration example of anisotropic light diffusion layers having a columnar structure and a tabular structure in an anisotropic optical film according to this embodiment, wherein (a) represents a tabular structure and (b) represents a columnar structure.
Figure 5:
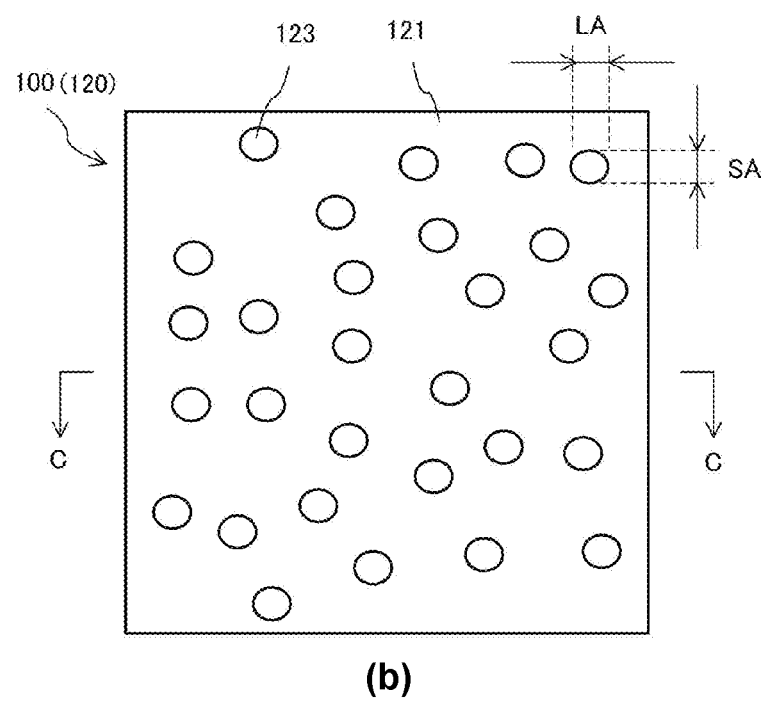

The configuration of an anisotropic optical film 100 according to this embodiment will be described with reference to FIG. 5. FIG. 5 shows an example of the configurations of anisotropic light diffusion layers 110 and 120 in the anisotropic optical film 100 according to this embodiment. In the following description, the anisotropic optical film 100 may be simply referred to as the anisotropic light diffusion layers 110 and 120.

<<2-1. Overall Configuration>>

As shown in FIG. 5, the anisotropic optical film 100 is an anisotropic optical film having two anisotropic light diffusion layers of the anisotropic light diffusion layer 110 or the anisotropic light diffusion layer 120 whose linear transmittance changes depending on the incident light angle.

The anisotropic light diffusion layer 110 has a matrix region 111 and a plurality of pillar structures 113 (pillar region) having a refractive index different from that of the matrix region 111. The anisotropic light diffusion layer 120 has a matrix region 121 and a plurality of pillar structures 123 (pillar region) having a refractive index different from that of the matrix region 121. Here, when merely expressed as a pillar region, the pillar region includes a columnar region and a tabular region. In addition, when merely expressed as a pillar structure, the pillar structure includes a columnar structure and a tabular structure.

Hereinafter, the anisotropic optical film 100 having the anisotropic light diffusion layer 110 or the anisotropic light diffusion layer 120 will be described in detail.

<<2-2. Anisotropic Light Diffusion Layer 110>>

The anisotropic light diffusion layer 110 has the above-described tabular structure (the configuration same as that of the anisotropic optical film 20 in FIG. 1(b)), and has light diffusibility in which the linear transmittance changes depending on the incident light angle. The anisotropic light diffusion layer 110 is made of a cured product of a composition containing a photopolymerizable compound and, as shown in FIG. 5A, includes the matrix region 111 and a plurality of pillar structures 113 (pillar region) having a refractive index different from that of the matrix region 111. The orientation direction P (extending direction) of the pillar structure 113 is formed so as to be parallel to the scattering central axis, and is determined as appropriate so that the anisotropic light diffusion layer 110 has a desired linear transmittance and diffusibility. It should be noted that the orientation directions of the scattering central axis and the pillar region can be parallel to each other as long as they satisfy the law of refractive index (Snell's law), and need not be strictly parallel. According to Snell's law, when light is incident on the interface of the medium having the refractive index $n_2$ from the medium having the refractive index $n_1$, the relation of $n_1 \sin \theta_1 = n_2 \sin \theta_2$ holds between the incident light angle $\theta_1$ and the refraction angle $\theta_2$. For example, assuming that $n_1=1$ (air) and $n_2=1.51$ (anisotropic optical film), the orientation direction (refraction angle) of the pillar region is about 19° when the incident light angle is 30°. Even if the incident light angle and the refraction angle are different from each other, the concept of parallel is applied in the present embodiment as long as they satisfy the Snell's law.

The anisotropic light diffusion layer 110 may be such that the orientation direction of the pillar structure 113 does not match the film thickness direction (normal direction) of the film. In this case, the anisotropic light diffusion layer 110 has properties in which the incident light is strongly diffused in an incident light angle range (diffusion region) close to a direction inclined at a predetermined angle from the normal direction (that is, an orientation direction of the pillar structure 113), and the diffusion is weakened and the linear transmittance is increased in an incident light angle range (non-diffusion region) beyond the above range.

<2-2-1. Pillar Structure 113>

The pillar structures 113 according to this embodiment are provided as a plurality of pillar curing regions in the matrix region 111 and each of the pillar structures 113 is formed such that the orientation direction is parallel to the scattering central axis. Therefore, the plurality of pillar structures 113 in the same anisotropic light diffusion layer 110 are formed so as to be parallel to each other.

The refractive index of the matrix region 111 may be acceptable as long as it is different from the refractive index of the pillar structure 113, but how much the refractive index differs is not particularly limited, and is relative. When the refractive index of the matrix region 111 is lower than the refractive index of the pillar structure 113, the matrix region 111 is a low refractive index region. Conversely, when the refractive index of the matrix region 111 is higher than the refractive index of the pillar structure 113, the matrix region 111 is a high refractive index region. Here, it is preferable that the refractive index at the interface between the matrix region 111 and the pillar structure 113 is incrementally changed. By incrementally changing the refractive index, the problem that the change in diffusibility is extremely sharp when the incident light angle is changed, resulting in glaring, is not likely to occur. By forming the matrix region 111 and the pillar structure 113 by phase separation accompanying light irradiation, it is possible to incrementally change the refractive index of the interface between the matrix region 111 and the pillar structure 113.

As shown in FIG. 5A, a cross-sectional shape perpendicular to the orientation direction of the pillar structure 113 has a short diameter SA and a long diameter LA. The short diameter SA and the long diameter LA can be confirmed by observing the anisotropic light diffusion layer 110 with an optical microscope (details will be described later). The cross-sectional shape of the pillar structure 113 preferably meets a range of the aspect ratio (2 or more) described later, but is not particularly limited. For example, in FIG. 5A, the cross-sectional shape of the pillar structure 113 is shown as an elliptic shape, but the cross-sectional shape of the pillar structure 113 is not particularly limited.

<<2-3. Anisotropic Light Diffusion Layer 120>>

The anisotropic light diffusion layer 120 has a columnar structure (the configuration same as that of the anisotropic optical film 10 in FIG. 1(*a*)), has light diffusibility in which the linear transmittance changes depending on the incident light angle. As shown in FIG. 5B, the anisotropic light diffusion layer 120 is made of a cured product of a composition containing a photopolymerizable compound and includes a matrix region 121 and a plurality of pillar structures 123 having a refractive index different from that of the matrix region 121. The plurality of pillar structures 123 and the matrix region 121 have irregular distributions and shapes, but they are formed over the entire surface of the anisotropic light diffusion layer 120, so that obtained optical characteristics (for example, linear transmittance, etc.) are substantially the same. Since the plurality of pillar structures 123 and the matrix region 121 have irregular distributions and shapes, the anisotropic light diffusion layer 120 according to this embodiment is not likely to generate light interference (rainbow).

<2-3-1. Pillar Structure 123>

The pillar structure 123 according to this embodiment is provided as a plurality of pillar curing regions in the matrix region 121 and each pillar structure 123 is formed so that the orientation direction is parallel to the scattering central axis. Therefore, the plurality of pillar structures 123 in the same anisotropic light diffusion layer 120 are formed so as to be parallel to each other.

The refractive index of the matrix region 121 may be different from the refractive index of the pillar region, but how much the refractive index differs is not particularly limited and is relative. When the refractive index of the matrix region 121 is lower than the refractive index of the pillar region, the matrix region 121 is a low refractive index region. Conversely, when the refractive index of the matrix region 121 is higher than the refractive index of the pillar region, the matrix region 121 is a high refractive index region.

As shown in FIG. 5B, a cross-sectional shape perpendicular to the orientation direction of the pillar structure 123 has the short diameter SA and the long diameter LA. It is preferable that the cross-sectional shape of the pillar structure 123 satisfies the range of the aspect ratio (less than 2) described below. For example, in FIG. 5B, the cross-sectional shape of the pillar structure 123 is shown as a circle. The cross-sectional shape of the pillar structure 123 is not limited to a circular shape but may be an elliptic shape, a polygonal shape, an indefinite shape, a combination thereof, and others.

<<2-4. Aspect Ratio of Pillar Structure 113 and Pillar Structure 123>>

The plurality of pillar structures 113 has preferably the aspect ratio (=average long diameter/average short diameter) of the average value (average short diameter) of the long diameters LA to the average value (average long diameter) of the short diameters SA of 2 or more, more preferably the aspect ratio of 2 or more and less than 50, still more preferably the aspect ratio of 2 or more and 10 or less, and particularly preferably the aspect ratio of 2 or more and 5 or less.

The plurality of pillar structures 123 has preferably the aspect ratio (=average long diameter/average short diameter) of the average value (average short diameter) of the short diameters SA and the average value (average long diameter) of the average long diameter LA of less than 2. Further, the pillar structure 123 has more preferably the aspect ratio of the average long diameter LA to the average short diameter SA of less than 1.5, and still more preferably the aspect ratio of less than 1.2.

The anisotropic optical film 100 according to this embodiment has various characteristics at a higher level in a well-balanced manner by setting the aspect ratio of the average long diameter to the average short diameter of the plurality of pillar structures 123 to the above preferable ranges.

<2-4-1. Average Short Diameter and Average Long Diameter of Pillar Structure 113 and Pillar Structure 123>

Further, the average value (average short diameter) of the short diameters SA of the plurality of pillar structures 113 is preferably 0.5 µm or more, more preferably 1.0 µm or more, and still more preferably 1.5 µm or more. On the other hand, it is preferable that the average value (average short diameter) of the short diameters SA of the plurality of pillar structures 113 is 5.0 µm or less, more preferably 4.0 µm or less, and still more preferably 3.0 µm or less. The lower limit value and the upper limit value of the average short diameter of the plurality of pillar structures 113 can be appropriately combined.

Further, the average value (average long diameter) of the long diameters LA of the plurality of pillar structures 113 is preferably 0.5 µm or more, more preferably 1.0 µm or more, and still more preferably 1.5 µm or more. On the other hand, the average value (average long diameter) of the long diameters LA of the plurality of pillar structures 113 is preferably 100 µm or less, more preferably 50 µm or less, and still more preferably 30 µm or less. The lower limit value and the upper limit value of the average long diameter of the plurality of pillar structures 113 can be appropriately combined.

Further, the average value (average short diameter) of the short diameters SA of the plurality of pillar structures 123 is preferably 0.5 µm or more, more preferably 1.0 µm or more, and still more preferably 1.5 µm or more. On the other hand, it is preferable that the average value (average short diameter) of the short diameters SA of the plurality of pillar structures 123 is 5.0 µm or less, more preferably 4.0 µm or less, and still more preferably 3.0 µm or less. The lower limit value and the upper limit value of the average short diameter of the plurality of pillar structures 123 can be appropriately combined.

Further, the average value (average long diameter) of the long diameters LA of the plurality of pillar structures 123 is preferably 0.5 µm or more, more preferably 1.0 µm or more, and still more preferably 1.5 µm or more. On the other hand, the average value (average long diameter) of the long diameters LA of the plurality of pillar structures 123 is preferably 8.0 µm or less, more preferably 5.0 µm or less, and still more preferably 3.0 µm or less. The lower limit value and the upper limit value of the average long diameter of the plurality of pillar structures 123 can be appropriately combined.

The anisotropic optical film 100 according to the present embodiment has various characteristics at a higher level in a well-balanced manner by setting both the average short diameter and the average long diameter of the plurality of columnar structures 113 and the plurality of columnar structures 123 to the above preferable ranges.

Note that the average value (average short diameter) of the short diameters SA and the average value (average long diameter) of the long diameters LA of the plurality of pillar structures 113 and the plurality of pillar structures 123 in this embodiment may be obtained by observing the surface of the anisotropic light diffusion layer 120 with a microscope, measuring the short diameters SA and the long diameters LA of the appropriately selected twenty pillar structures 113 and pillar structures 123, and calculating the average value of them. A value obtained by dividing the average value (average long diameter) of the long diameters LA obtained above by the average value (average short diameter) of the short diameters SA is used as the aspect ratio of the pillar structure.

<<2-5. Thickness of Region where Pillar Structures 113 and 123 are Formed>>

The thickness T of the plurality of pillar structures 113 and 123 is preferably from 10 µm to 200 µm, more preferably 20 µm or more and less than 100 µm, and still more preferably 20 µm or more and less than 50 µm. When the thickness T exceeds 200 µm, not only the material cost is increased but also the cost for UV irradiation is increased, so that not only the cost is increased but also image blurring and contrast reduction due to an increase in diffusibility in the thickness T direction is likely to occur. In addition, when the thickness T is less than 10 µm, it may be difficult to provide sufficient diffusibility and condensation of light. According to the present invention, by setting the thickness T within the specified range, it is possible to reduce the cost problem, and to achieve excellent diffusibility and condensation of light, and image blurring is not likely to occur, and the contrast can be improved due to reduction in the light diffusibility in the thickness T direction.

<<2-6. Properties of Anisotropic Optical Film 100>>

As described above, the anisotropic optical film 100 has the anisotropic light diffusion layer 110 or 120. More specifically, the anisotropic light diffusion layer 110 has a tabular structure (preferably, a region having a pillar region having an aspect ratio of 2 or more). The anisotropic light diffusion layer 120 has a columnar structure (preferably a region having a pillar region with an aspect ratio of less than 2). The properties of such an anisotropic optical film 100 will be described below.

<2-6-1. Linear Transmittance>

Here, assuming the linear transmittance of light incident into the anisotropic optical film 100 (the anisotropic light diffusion layers 110 and 120) at the incident light angle at which the linear transmittance is maximized is defined as the maximum linear transmittance, the anisotropic optical film 100 (the anisotropic light diffusion layers 110 and 120) has a maximum linear transmittance of 15% or more and less than 90%, preferably 20% or more and less than 90%, more preferably 30% or more and less than 90%, still more preferably 50% or more and less than 90%, and particularly preferably 70% or more and less than 90%.

Note that the linear transmittance of light incident into the anisotropic light diffusion layer 110 or 120 at the incident light angle at which the linear transmittance is minimized can be defined as the minimum linear transmittance. The minimum linear transmittance is preferably 10% or less.

By setting the maximum linear transmittance of the anisotropic optical film 100 in the above range, it is possible to obtain an appropriate anisotropy, so that the applicable range of the anisotropic optical film 100 can be widened. For example, when the anisotropic optical film 100 is used for a display device, if the anisotropy is too strong, there is a problem that the diffusion and condensation of light in the TD direction tends to be inadequate although the diffusion and condensation of light in the MD direction is extremely excellent. The anisotropic optical film 100 according to this embodiment has the maximum linear transmittance described above, so that it maintains excellent diffusion and condensation of light in the MD direction, and furthermore provides sufficient diffusion and condensation of light in the TD direction.

Here, the linear transmitted light quantity and the linear transmittance can be measured by the method shown in FIG. 2 described above. That is, the linear transmitted light quantity and the linear transmittance are measured for each incident light angle so that the straight line V shown in FIG. 2 coincides with the C-C axis shown in FIG. 5 (the normal direction is set to 0°). An optical profile is obtained from the obtained data, and the maximum linear transmittance and the minimum linear transmittance can be obtained from this optical profile.

Further, the maximum linear transmittance and the minimum linear transmittance of the anisotropic optical film 100 (the anisotropic light diffusion layers 110 and 120) can be adjusted by design parameters at the time of manufacture. Examples of the parameters include the composition of the coating film, the film thickness of the coating film, the temperature applied to the coating film at the time of formation of the structure, and the like. The appropriate selection and preparation of the composition of the coating film changes the maximum linear transmittance and the minimum linear transmittance. With design parameters, the maximum linear transmittance and the minimum linear transmittance tend to be lower as the film thickness is thick, and they tend to be higher as the film thickness is thin. The higher the temperature, the lower the maximum linear transmittance and the minimum linear transmittance tend to be, and the lower the temperature, the higher the maximum linear transmittance and the minimum linear transmittance tend to be. By combining these parameters, it is possible to appropriately adjust the maximum linear transmittance and the minimum linear transmittance.

<2-6-2. Diffusion Width>

According to the above method, the maximum linear transmittance and the minimum linear transmittance of the anisotropic optical film 100 are obtained, and the linear transmittance of the intermediate value between the maximum linear transmittance and the minimum linear transmittance is obtained. Two incident light angles with respect to the linear transmittance of this intermediate value are read. In the optical profile, the normal direction is 0°, and the incident light angle is shown in the negative direction and the positive direction. Therefore, the incident light angle and the incident light angle corresponding to the intersection may have a negative value in some cases. If the values of the two intersections have a positive incident light angle value and a negative incident light angle value, the sum of the absolute value of the negative incident light angle value and the positive incident light angle value represents the diffusion width, which is the angle range of the diffusion region of incident light. If the values of the two intersections are both positive, the difference obtained by subtracting the smaller value from the larger value represents the diffusion width, which is the angle range of the incident light angle. If the values at the two intersections are both negative, take the absolute values of the respective values, and the difference obtained by subtracting the smaller value from the larger value is the diffusion width, which is the angle range of the incident light angle.

In the anisotropic optical film 100, the width (diffusion width) of the diffusion region, which is the angle range of the two incident light angles with respect to the linear transmittance of the intermediate value between the maximum linear transmittance and the minimum linear transmittance is preferably 10° or more and less than 70°, and more preferably 30° or more and less than 50° in the MD direction. Also, the width is preferably 5° or more and less than 50°, and more preferably 20° or more and less than 30° in the TD direction. In the case where it is outside the specified range, that is, when the diffusion width is too wide, the condensation of light is weakened, and when the diffusion width is too narrow, the diffusibility is weakened, resulting in the reduction in display property and visibility. That is, in the present invention, since the diffusion width is within the specified range, it is possible to balance the diffusibility and condensation of light, and to further enhance the effect of suppressing an abrupt change in the luminance.

<2-6-3. Scattering Central Axis>

Figure 6:
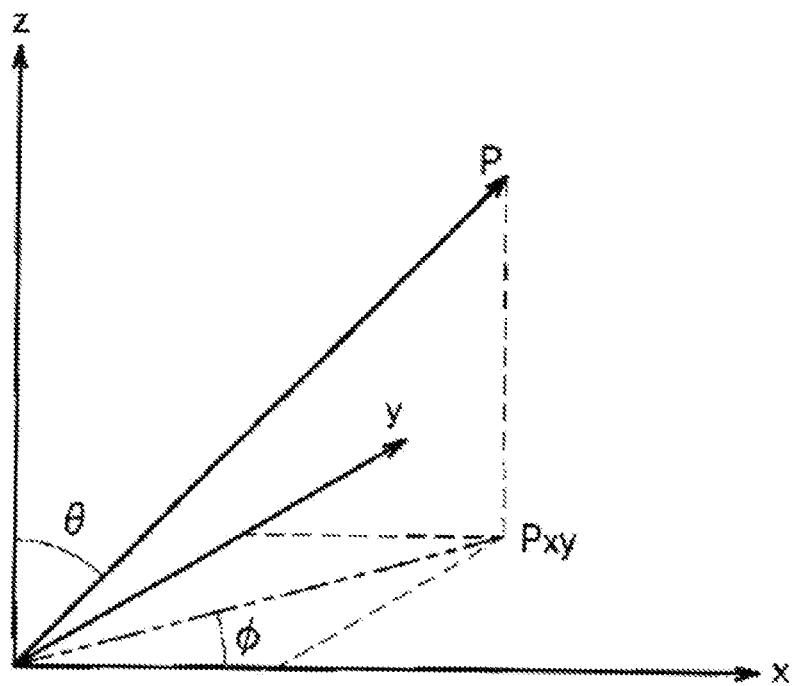
FIG. 6 is a three-dimensional polar coordinate display for explaining the scattering central axis in the anisotropic light diffusion layer according to the present embodiment.

Next, with reference to FIG. 6, a scattering central axis P in the anisotropic light diffusion layer will be described. FIG. 6 is a three-dimensional polar coordinate display for explaining the scattering central axis P in the anisotropic optical film 100 (anisotropic light diffusion layer).

The anisotropic light diffusion layer has at least one scattering central axis. As described above, the scattering central axis is a direction in which coincides with the incident light angle with respect to which light diffusibility has a substantially symmetric property when changing the incident light angle to the anisotropic light diffusion layer. Note that the incident light angle (scattering central axis angle) is the central portion of the diffusion region in this optical profile when the optical profile of the anisotropic light diffusion layer is measured.

Further, according to the three-dimensional polar coordinate display as shown in FIG. 6, when the surface of the anisotropic light diffusion layers 110 and 120 is defined as the xy plane and the normal line is defined as the z axis, the scattering central axis is expressed by the polar angle θ and the azimuth angle φ. That is, Pxy in FIG. 6 can be regarded as the length direction of the scattering central axis projected on the surface of the anisotropic light diffusion layer.

Here, the anisotropic light diffusion layers 110 and 120 may have a plurality of pillar region groups (a combination of a group of pillar regions having the same inclination) having different inclinations in a single layer. It is preferable that the lower limit of the absolute value of the difference between the scattering central axis angles is 5°. On the other hand, the upper limit of the absolute value of the difference in scattering central axis angle is preferably 20°, and more preferably 15°.

<2-6-4. Refractive Index>

The anisotropic light diffusion layers 110 and 120 are obtained by curing a composition containing a photopolymerizable compound. As the composition, the following combinations can be used.

(1) use of a single photopolymerizable compound (2) use by mixing a plurality of photopolymerizable compounds (3) use by mixing a single or a plurality of photopolymerizable compound(s) and a polymer compound not having photopolymerizability.

It is conjectured that in any of the above combinations, a microscopic structure of micron order having a different refractive index is formed in the anisotropic light diffusion layer 110 or 120 by light irradiation, and accordingly, it seems that the specific anisotropic light diffusion characteristics shown in this embodiment are developed. Therefore, in (1) above, it is preferable that the compound having a large change in the refractive index before and after photopolymerization is used, and in (2) and (3), it is preferable that a plurality of materials having different refractive indexes are combined. Here, the change in refractive index and the difference in refractive index here specifically indicate a change and a difference of preferably 0.01 or more, more preferably 0.05 or more, and still more preferably 0.10 or more.

Here, when the refractive index of the matrix region 121 is higher than the refractive index of the pillar structure 113 or 123, the matrix region 121 is regarded as a high refractive index region, and the plurality of pillar structures 113 or 123 is regarded as a low refractive index region. The difference between a refractive index of the matrix region 121 (high refractive index region) and a refractive index of the pillar structure 113 or 123 (low refractive index region) is, for example, preferably in the range of 0.01 to 0.20, and more preferably in the range of 0.05 to 0.10.

3. Isotropic Light Diffusion Layer 200

An isotropic light diffusion layer 200 (for example, FIG. 7) is a layer containing a light-transmitting resin as a base material and fine particles for diffusing light by a difference between a refractive index of the fine particles and a refractive index of the base material. The isotropic light diffusion layer 200 diffuses light irrespective of the incident angle of light and has no directionality in diffusibility. More specifically, the isotropic light diffusion layer 200 has properties in which when the light is diffused by the isotropic light diffusion layer 200, the degree of diffusion (shape of spreading diffused light) of the diffused light (emitted light) in a plane parallel to the isotropic light diffusion layer 200 does not change depending on the direction in the same plane.

<<3-1. Resin Base Material>>

Conventionally, acrylic resin, polyester resin, epoxy resin, polyurethane resin, silicone resin, and the like are known as the resin constituting the isotropic light diffusion layer 200. The acrylic resin is particularly preferable because it has high optical transparency, good workability, has a refractive index close to that of a TAC film, which is a protective film of the polarization plate, and is relatively inexpensive. Further, adhesiveness may be imparted to the resin so that the isotropic light diffusion layer 200 can be easily laminated with another member (for example, a reflective display device). In this case, an adhesive made of an acrylic resin is preferably used in the present embodiment because it has high reliability and a large number of records of performance as an adhesive for a polarization plate, in addition to the merit of the acrylic resin.

<<3-2. Fine Particles, Other Components>>

Fine particles to be mixed/dispersed in the resin have preferably a refractive index different from that of the resin serving as the base material, and are preferably colorless or white in order to prevent coloring of the transmitted light. For example, inorganic fine particles, white pigments, resin fine particles, and the like are used. Specific examples thereof include silica fine particles, alumina fine particles, zirconium fine particles, silicone fine particles, acrylic resin fine particles, polystyrene resin fine particles, styrene-acrylic copolymer resin fine particles, polyethylene resin fine particles, and epoxy resin fine particles. Further, one or two or more crosslinking agents such as metal chelate-based agent, isocyanate-based agent, epoxy-based agent, etc. may be mixed in the resin as required.

Furthermore, as other components for forming the isotropic light diffusion layer 200, a thickener, a surfactant, a dispersant, a plasticizer, a leveling agent, and the like can be optionally added in addition to an initiator such as a photoinitiator and as a thermal curing initiator, and a solvent.

<<3-3. Refractive Index>>

The difference between the refractive index of the resin serving as the base material (the B method according to JIS K-7142) and the refractive index of the fine particles is preferably in the range of 0.01 to 0.10, and more preferably in the range of 0.02 to 0.05.

In the present embodiment, it is preferable to use an acrylic adhesive and silicone resin fine particles. The refractive index of the silicone resin fine particles is 1.40 to 1.45, and it has a refractive index slightly lower than the refractive index of 1.45 to 1.55 of the acrylic adhesive, and as a result, when compared with other materials, it has high the light transmittance, small back scattering and depolarization, and is excellent for application to a reflective display device.

<<3-4. Average Particle Diameter>>

The average particle diameter of the fine particles is preferably 0.1 to 20 µm, and more preferably 1 to 10 µm. When the average particle diameter is less than 0.1 µm, the light diffusing performance is low and the metallic luster of the light reflecting plate is visible, so that the paper white property cannot be obtained. On the other hand, when the average particle diameter exceeds 20 µm, the particles are too rough, so that a mat pattern or glare appears on a background of the screen, and the contrast is lowered. Here, the average particle diameter is measured by the coulter counter method.

<<3-5. Content>>

The content of fine particles in the isotropic light diffusion layer 200 is preferably 5.0 to 50.0% by weight, and more preferably 7.5 to 45% by weight. When the content is less than 5.0% by weight, the light diffusibility decreases, and when it exceeds 50.0% by weight, it is difficult to uniformly disperse the fine particles in the isotropic light diffusion layer 200, and optical characteristics such as light diffusibility is lowered, and the adhesive strength is lowered and peeling is liable to occur in the case of an adhesive.

<<3-6. Haze Value>>

The haze value of the isotropic light diffusion layer 200 is preferably 40% or more and less than 80%, and more preferably 45% or more and 75% or less. When the haze value is less than 40%, sufficient diffusion is not obtained and luminance is lowered. In addition, the luminance is lowered even when the haze value is 80% or more, and the image is likely to be blurred. Here, the haze value (Hz %) is a value calculated by the following expression by measuring diffuse transmittance (%) and total light transmittance (%) in accordance with JIS K7105. Hz (%)=(diffuse transmittance/total light transmittance)×100

<<3-7. Total Light Transmittance>>

The total light transmittance of the isotropic light diffusion layer 200 is preferably 85% or more. When the total light transmittance is less than 85%, the screen of the reflective liquid crystal display device described later is dark and the image contrast may be lowered. The total light transmittance of the isotropic light diffusion layer 200 is more preferably 90% or more.

The thickness of the isotropic light diffusion layer 200 is preferably 5 µm or more and 100 µm, more preferably 10 µm or more, and less than 50 µm, and still more preferably 10 µm or more, and less than 25 µm. If the thickness is thick (for example, 100 µm or more), the image is not suitable because it is easy to be blurred. Also, when the thickness is small (for example, less than 5 µm), the adhesive strength in the case of an adhesive is insufficient, which is not preferable.

4. Arrangement Configuration of Anisotropic Optical Film 100 and Isotropic Light Diffusion Layer 200 (Light Diffusion Film Laminate 30)

Figure 7:
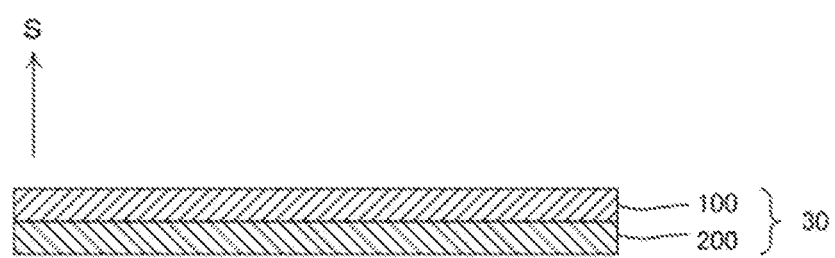
FIG. 7 is an explanatory view showing an arrangement configuration of an anisotropic optical film and an isotropic light diffusion layer according to this embodiment.

As shown in FIG. 7, a light diffusion film laminate 30 according to this embodiment is an anisotropic optical film (laminate) in which the anisotropic optical film 100 and the isotropic light diffusion layer 200 are laminated. Preferably, the light diffusion film laminate 30 includes the anisotropic optical film 100 which is disposed on the external light side such as the sun side or on the viewer's viewing side (outer surface side), and the isotropic light diffusion layer 200 opposite to the anisotropic optical film 100 (opposite to the viewer side). With such an arrangement, it is possible to effectively use the anisotropy of the anisotropic optical film 100, not only the luminance at a predetermined observation position (for example, the front direction of the screen) increases but also an image is not likely to blur.

The anisotropic optical film 100 used in this embodiment is, for example, an anisotropic optical film having a columnar structure or a tabular structure. Further, it is not limited to the columnar structure and the tabular structure, but may be, for example, an anisotropic light diffusion layer (also referred to as an intermediate structure or a tabular pillar like structure) having a pillar structure having an aspect ratio of a value between the aspect ratio of the columnar structure and the aspect ratio of the tabular structure. The isotropic light diffusion layer 200 is characterized by using fine particles having a refractive index different from that of the resin serving as a base material and has diffusibility independent of the incident angle of light, so that the diffusing function of the anisotropic optical film 100 can be compensated. Here, the light incident into the light diffusion film laminate 30 means, external light such as the sunlight and a room, and does not include light from a light projector that projects a light image on the screen.

Here, the anisotropic optical film 100 has one scattering central axis P, and the scattering central axis P is preferably in a range of +6° or more and +40° or less, or −40° or more and −6° or less with respect to the normal direction S (film thickness direction of the film) of the anisotropic optical film 100. Further, it is more preferable that the scattering central axis P is in the range of +6° or more and +25° or less, or in the range of −25° or more and −6° or less. When the scattering central axis P (the incident light angle in this direction is 0°) coincides with the normal direction S, the orientation direction (extending direction) of the plurality of pillar structures of the anisotropic optical film 100 is formed so as to be parallel to the scattering central axis P and the normal direction S.

It is preferable that, in the anisotropic optical film 100, the maximum linear transmittance which is a linear transmittance at the incident light angle, at which the transmitted light quantity in the linear direction of the incident light/the light quantity of the incident light is maximized, is 15% or more and less than 90%, and the minimum linear transmittance which is a linear transmittance at an incident angle, at which the linear transmittance is minimized, is 10% or less, and the preferable anisotropic optical film 100 is such that as the linear transmittance decreases, the diffuse transmittance of the incident light is increased.

Further, with respect to the light diffusion film laminate 30 in which the anisotropic optical film 100 and the isotropic light diffusion layer 200 are laminated, the maximum linear transmittance which is the linear transmittance at the incident light angle, at which the transmitted light quantity in the linear direction of the incident light/the light quantity of the incident light is maximized, is 5% or more and less than 20%, and the minimum linear transmittance which is the linear transmittance at the incident angle, at which the linear transmittance is minimized, is 2% or less. In the anisotropic optical film 100, it is preferable that the diffuse transmittance of the incident light increases as the linear transmittance decreases.

In the case of a reflective display device (for example, a liquid crystal type) requiring a polarization plate, for example, a TAC film, a retardation film, a polarization plate, or the like may be laminated via an adhesive on the surface of the anisotropic optical film 100 (the reflected light viewing side, the external light incidence surface side, or the viewer's viewing side). In the case of a reflective display device (for example, other than liquid crystal type) not using a polarization plate, for example, a PET film, a TAC film, or the like may be laminated on the outer surface of the anisotropic optical film 100 via an adhesive.

In this manner, the light diffusion film laminate 30 in which the anisotropic optical film 100 and the isotropic light diffusion layer 200 are laminated is applied to for example, a reflective display device including a reflective member (not shown) (for example, a mirror for reflecting light such as a reflecting film, a reflecting plate, etc.), so that it is possible to minimize the inhibition of the anisotropic effect of the anisotropic optical film 100 at the time of incidence of external light and emission of reflected light, and it is possible to maintain the reflection luminance in the front direction of the screen and in the oblique direction deviated from the front of the screen of the reflective display device.

As described above, the anisotropic optical film 100 has properties in which light diffusion preferentially occurs in the diffusion region and light transmission preferentially occurs in the non-diffusion region.

Here, the scattering central axis angle with respect to the normal direction (film thickness direction of the film) of the anisotropic optical film 100 is set to +15°, and the incident light angle of light with respect to the normal direction of the anisotropic optical film 100 is set to −30°. In this case, since the incident light angle is largely different from the scattering central axis angle, and the anisotropic optical film 100 is a non-diffusion region, the light is hardly diffused in the anisotropic optical film 100, and light transmission is preferential. Light reaches the reflective layer which is a reflective member in the reflective display device (or reaches the reflective layer in the reflective display device after diffused in the isotropic light diffusion layer) and is regularly reflected by the reflective layer.

The regularly reflected light enters from the surface (the back surface of the anisotropic optical film 100) opposite to the surface on which the incident light of the anisotropic optical film 100 is incident (depending on the configuration, after light is transmitted through the isotropic light diffusion layer). If the anisotropic optical film 100 is the diffusion region where the difference between the incident light angle of the reflected light to the anisotropic optical film 100 and the scattering central axis angle is small (for example, +30° with respect to the normal direction of the anisotropic optical film 100), light is strongly diffused in the anisotropic optical film 100.

That is, since the anisotropic optical film 100 diffuses the incident light only in a predetermined range, the reflection luminance can be increased.

As described above, the isotropic light diffusion layer 200 includes light diffusing fine particles that diffuse light, diffuses light irrespective of the incident angle of light, and has a property (isotropy) of not having directivity in diffusibility. Therefore, it is possible to widen the diffusion range by isotropically diffusing the light by the isotropic light diffusion layer 200, and to prevent the visibility in the oblique direction deviated from the front direction from deteriorating.

As a result, the light diffusion film laminate 30 can increase the reflection luminance in the front direction of the screen (0°) of the reflective display device and can prevent the visibility from deteriorating even in a position away from a predetermined observation position (for example, in an oblique direction deviated from the front of the screen).

5. Reflective Display Device

The reflective display device according to the present embodiment does not have any particular limitation as long as it has a reflection function. Examples of a specific display method applied to the reflective display device include known techniques such as an electronic powder method, a liquid crystal method (cholesteric liquid crystal, bistable nematic liquid crystal, pixel memory liquid crystal, etc.), an electrowetting method, an electrochromic method, and an electrophoretic method (microcapsule, etc.).

Here, the light diffusion film laminate 30 in the reflective display device of the present invention is laminated on the surface of the planar substrate (external light incidence surface side), which is located on the external light incident surface side (the viewer's viewing side, the reflected light viewing side) of the reflective display device, and which is located on the front side from the image forming portion in each display method (for example, a microcapsule in the electrophoretic method, a portion of enclosing the electronic powder or granule in the electronic powdery granular method, a portion of sealing water and oil film in electrowetting method, a liquid crystal layer in the liquid crystal method, etc.).

Here, the planar substrate specifically means glass, a resin molded body, a film, or the like. In the light diffusion film laminate 30 of the present invention, the light diffusion film laminate 30 is laminated on the planar substrate surface (external light incidence surface side, the reflected light viewing side). At this time, which of the anisotropic optical film 100 and the isotropic light diffusion layer 200 of the light diffusion film laminate 30 is to be laminated on the planar substrate surface of the reflective display device is not predetermined. It is preferable to laminate them on the planar substrate such that the anisotropic optical film 100 in the light diffusion film laminate 30 is located on the external light incidence surface side (the viewer's viewing side, the reflected light viewing side), and the isotropic light diffusion layer 200 is located on the image forming portion side of the reflective display device.

In this case, in a case where the isotropic light diffusion layer 200 is laminated on the planar substrate such that the isotropic light diffusion layer 200 is located on the image forming portion side of the reflective display device, when the isotropic light diffusion layer 200 is an adhesive, the isotropic light diffusion layer 200 is directly laminated on the planar substrate, and when the isotropic light diffusion layer 200 is not an adhesive, the isotropic light diffusion layer 200 is laminated on the planar substrate via the adhesive. On the other hand, when the anisotropic optical film 100 is laminated on the planar substrate such that the anisotropic optical film 100 is located on the image forming portion side of the reflective display device, the lamination may be performed via a known adhesive having transparency.

when the anisotropic optical film 100 is laminated on the planar substrate such that the anisotropic optical film 100 is located on the image forming portion side of the reflective display device, a TAC film, a retardation film, a polarization plate, or the like may be optionally laminated on the surface of the isotropic light diffusion layer 200 (the reflected light viewing side, external light incidence surface side, or the viewer's viewing side), for example, via an adhesive.

6. Example

Next, the present invention will be described in more detail with reference to Examples and Comparative Examples, but the present invention is not limited to these Examples.

According to the following method, the light diffusion film laminate of the present invention (the anisotropic optical film and the isotropic light diffusion layer, in Examples, the anisotropic optical film includes the anisotropic light diffusion layer as a single layer) and Comparative Examples were prepared. The anisotropic light diffusion layer was prepared by the existing method described below (for example, JP 2006-119241 A). The isotropic light diffusion layer was prepared by the existing method described below (for example, JP 2002-122714 A).

<Anisotropic Light Diffusion Layer>

Using a dispenser, a partition wall having a height of 50 μm made of a curable resin was formed around the entire edge of a 100 μm thick PET film (Trade name: A4300, manufactured by TOYOBO CO., LTD.). The following ultraviolet curable resin composition was dropped therein and the film was covered with another PET film.

Silicone urethane acrylate (refractive index: 1.460, weight average molecular weight: 5,890) 20 parts by weight
(Trade name: 00-225/TM18, manufactured by RAHN AG)

Neopentyl glycol diacrylate (refractive index: 1.450) 30 parts by weight
(Trade name Ebecryl 145, manufactured by Daicel-Cytec Co., Ltd.)

EO adduct diacrylate of bisphenol A (refractive index: 1.536) 15 parts by weight
(Trade name: Ebecyl 150, manufactured by Daicel-Cytec Co., Ltd.)

Phenoxyethyl acrylate (refractive index: 1.518) 40 parts by weight
(Trade name: Light Acrylate PO-A, manufactured by Kyoeisha Chemical Co., Ltd.)

2,2-dimethoxy-1,2-diphenylethan-1-one 4 parts by weight
(Trade name: Irgacure 651, manufactured by BASF SE)

The liquid film having a thickness of 50 μm sandwiched by the PET films was irradiated by an epi-illumination unit of a UV spot light source (Trade name: L2859-01, manufactured by Hamamatsu Photonics K.K.) with ultraviolet rays which are parallel rays with an irradiation intensity of 30 mW/cm² for 1 minute to obtain eight types of PET-attached anisotropic light diffusion layers (anisotropic optical films) having many bar-like minute regions as shown in FIG. 1 or 5. The eight types of anisotropic light diffusion layers produced are shown in Table 1 below.

The scattering central axis of the optical characteristics was adjusted by radiating parallel rays at any angle inclined from the normal direction of the coating film surface. Further, the aspect ratio of the pillar structure was adjusted by irradiating through a directional diffusion element capable of changing the aspect ratio of parallel rays. The directional diffusion element may be anything as long as it imparts directivity to the incident parallel rays. For example, there is a method of using an acicular filler having a high aspect ratio in the directional diffusion element. The aspect ratio of the pillar structure is formed in a shape substantially corresponding to the aspect ratio of the parallel rays changed by the directional diffusion element.

each of Examples and Comparative Examples were observed with an optical microscope and the long diameter LA and short diameter SA of the pillar structure in the pillar region were measured. The average long diameter LA and the average short diameter SA were calculated as an average value of any 20 structures. In addition, the average long

TABLE 1

| | TYPE | FILM THICKNESS | ANGLE OF SCATTERING CENTRAL AXIS | PILLAR STRUCTURE ASPECT RATIO | LINEAR TRANSMITTANCE | |
|---|---|---|---|---|---|---|
| | | | | | MINIMUM | MAXIMUM |
| ANISOTROPIC LIGHT DIFFUSION LAYER A | A | ABOUT 50 μm | ABOUT 15° | 1.1 | 4% | 26% |
| ANISOTROPIC LIGHT DIFFUSION LAYER B | B | ABOUT 50 μm | ABOUT 25° | 1.1 | 2% | 28% |
| ANISOTROPIC LIGHT DIFFUSION LAYER C | C | ABOUT 50 μm | ABOUT 35° | 1.0 | 2% | 32% |
| ANISOTROPIC LIGHT DIFFUSION LAYER D | D | ABOUT 50 μm | ABOUT 8° | 2.4 | 3% | 38% |
| ANISOTROPIC LIGHT DIFFUSION LAYER E | E | ABOUT 50 μm | ABOUT 15° | 2.3 | 4% | 45% |
| ANISOTROPIC LIGHT DIFFUSION LAYER F | F | ABOUT 50 μm | ABOUT 15° | 4.8 | 6% | 58% |
| ANISOTROPIC LIGHT DIFFUSION LAYER G | G | ABOUT 50 μm | ABOUT 0° | 1.1 | 4% | 24% |
| ANISOTROPIC LIGHT DIFFUSION LAYER H | H | ABOUT 50 μm | ABOUT 45° | 1.2 | 9% | 65% |

<Measurement of Angle of Scattering Central Axis and Linear Transmittance of Anisotropic Light Diffusion Layer>

As shown in FIG. 2, using a goniophotometer (manufactured by GENESIA), which is capable of varying the flood lighting angle of the light source and the light receiving angle of the detector, the linear transmittance of the anisotropic optical film (anisotropic light diffusion layer) of Examples shown in Table 1 was measured. The detector was fixed to the position where straight light from the light source was received, and the anisotropic optical film (anisotropic light diffusion layer) of Examples was set in the sample holder between the detector and the light source. As shown in FIG. 2, the sample was rotated around a rotation axis (V), and the linear transmitted light quantity corresponding to each incident light angle was measured. With this evaluation method, it is possible to measure the range of angle at which the incident light diffuses. This rotation axis (V) is the same axis as the C-C axis in the structure of the sample shown in FIG. 5. The linear transmitted light quantity was measured at a wavelength in the visible light region using a luminous efficacy filter. Based on the optical profiles obtained as a result of the measurement as described above, the maximum value (maximum linear transmittance) and minimum value (minimum linear transmittance) of the linear transmittance, and the angle of the scattering central axis from the approximate center (the central part of the diffusion region) between the minimum values in the optical profile are calculated and are summarized in Table 1.

<Measurement of Aspect Ratio of Pillar Structure (Observation of Surface of Anisotropic Light Diffusion Layer)>

The surfaces (irradiation light side at the time of ultraviolet irradiation) of the anisotropic light diffusion layer of diameter LA/average short diameter SA was calculated as the aspect ratio with respect to the average long diameter LA and average short diameter SA which were obtained, and summarized in Table 1.

<Isotropic Light Diffusion Layer>

A prescribed amount of silicone resin fine particles (Tospearl 145) as fine particles having a refractive index different from that of the adhesive was added to the base paint obtained by adding 0.5 parts of an isocyanate curing agent (trade name: L-45, manufactured by Soken Chemical & Engineering Co., Ltd.), and 0.2 parts of an epoxy curing agent (trade name: E-5XM, manufactured by Soken Chemical & Engineering Co., Ltd.) to 100 parts by weight of an acrylic adhesive having a refractive index of 1.47 (trade name: SK Dyne TM 206, total solid content concentration: 18.8%, solvent: ethyl acetate, methyl ethyl ketone, manufactured by Soken Chemical & Engineering Co., Ltd.). The obtained fine particles were stirred and dispersed for 30 minutes with an agitator. The obtained four types of isotropic light diffusion layer coating materials were applied to a release PET film (trade name: 38C, manufactured by LINTEC Corporation) having a thickness of 38 μm using a comma coater so that the film thickness after solvent drying was 25 μm or 40 μm. After drying them to form an isotropic diffusion adhesive layer, a release PET film (Trade name: 3801, manufactured by LINTEC Corporation) having a thickness of 38 μm was laminated to the isotropic diffusion adhesive layer. The four types of the isotropic light diffusion layers with the PET prepared are shown in Table 2 below. For comparison, a transparent adhesive layer e blended without adding silicone resin fine particles as a transparent adhesive layer was also prepared at the same time.

TABLE 2

| | TYPE | FILM THICKNESS | HAZE VALUE | TOTAL LIGHT TRANSMITTANCE |
|---|---|---|---|---|
| ISOTROPIC LIGHT DIFFUSION LAYER a | a | ABOUT 25 μm | 36% | 88% |
| ISOTROPIC LIGHT DIFFUSION LAYER b | b | ABOUT 25 μm | 47% | 92% |
| ISOTROPIC LIGHT DIFFUSION LAYER c | c | ABOUT 25 μm | 75% | 95% |
| ISOTROPIC LIGHT DIFFUSION LAYER d | d | ABOUT 40 μm | 83% | 85% |
| TRANSPARENT ADHESIVE LAYER e | e | ABOUT 25 μm | 1% | 90% |

<Measurement of Haze and Total Light Transmittance of Isotropic Light Diffusion Layer or Transparent Adhesive Layer>

After peeling off the PET film of the film of the isotropic light diffusion layer, the haze and total light transmittance were measured according to JIS K7136 using a haze meter NDH-2000 manufactured by NIPPON DENSHOKU INDUSTRIES CO., LTD. and were summarized in Table 2. The higher the haze value, the higher the diffusibility.

Example 1

An anisotropic light diffusion layer A with the PET and an isotropic light diffusion layer a with the PET were laminated after peeling off the PET film on the laminating surfaces of the anisotropic light diffusion layer A and the isotropic light diffusion layer a, and a light diffusion film laminate of Example 1 with two layers of an anisotropic optical film/isotropic light diffusion layer was obtained.

Subsequently, the anisotropic light diffusion layer A side of the light diffusion film laminate of Example 1 was bonded, via the transparent adhesive layer e, after peeling off the PET film, to a smooth mirror-surface reflection plate (reflectance of about 90%). Further, after peeling off the PET film on the surface of the isotropic light diffusion layer a side, highly transparent PET (Cosmoshine A4100 100 μm, manufactured by TOYOBO CO., LTD.) was laminated on the surface thereof to prepare a sample for evaluating reflection luminance and a sample for evaluating blurring impression.

In order to evaluate the blurring impression, a sample whose part of the mirror-surface reflection plate is printed with the evaluation pattern in advance was used, but the reflection luminance was evaluated using the part where there was no printed evaluation pattern. Further, in order to validate the linear transmittance in the laminated state of the anisotropic light diffusion layer and the isotropic light diffusion layer, a sample for the measurement of the linear transmittance including the highly transparent PET (Cosmoshine A4100 100 μm, manufactured by TOYOBO CO., LTD.) instead of the mirror-surface reflection plate was prepared, and the linear transmittance was measured as in the case of the anisotropic optical film (anisotropic light diffusion layer).

From the above, the data on the samples of Example 1 is shown in Table 3.

Examples 2 to 10

Preparation was carried out in the same manner as in Example 1, except that the combinations of the anisotropic light diffusion layer and the isotropic light diffusion layer in Table 3 were applied, and the light diffusion film laminates of Examples 2 to 10 of two layers of anisotropic optical film/isotropic light diffusion layer were obtained.

Subsequently, the isotropic light diffusion layer a to d side of each light diffusion film laminate of Examples 2 to 10 was bonded, after peeling off the PET film, to a smooth mirror-surface reflection plate (reflectance of about 90%). Further, after peeling off the PET film on the anisotropic light diffusion layer A to F side surface, in order to remove the influence of the surface smoothness of the anisotropic light diffusion layer, highly transparent PET (Cosmoshine A4100 100 μm, manufactured by TOYOBO CO., LTD.) was bonded, via the transparent adhesive layer e, on the surface thereof to prepare a sample for evaluating reflection luminance and a sample for evaluating blurring impression.

In order to evaluate the blurring impression, a sample whose part of the mirror-surface reflection plate is printed with the evaluation pattern in advance was used, but the reflection luminance was evaluated using the part where there was no printed evaluation pattern. Further, in order to validate the linear transmittance in the laminated state of the anisotropic light diffusion layer and the isotropic light diffusion layer, a sample for the measurement of the linear transmittance including the highly transparent PET (Cosmoshine A4100 100 μm, manufactured by TOYOBO CO., LTD.) instead of the mirror-surface reflection plate was prepared, and the linear transmittance was measured as in the case of the anisotropic optical film (anisotropic light diffusion layer).

From the above, the data on the samples of Examples 2 to 10 is shown in Table 3.

Comparative Example 1 and Comparative Example 2

Each isotropic light diffusion layer b or d prepared as described above was bonded, after peeling off the PET film, to a smooth mirror-surface reflection plate (reflectance of about 90%). Further, after peeling off the PET film on the surface of the isotropic light diffusion layer a side, highly transparent PET (Cosmoshine A4100 100 μm, manufactured by TOYOBO CO., LTD.) was bonded on the surface thereof to prepare a sample for evaluating reflection luminance and a sample for evaluating blurring impression.

In order to evaluate the blurring impression, a sample whose part of the mirror-surface reflection plate is printed with the evaluation pattern in advance was used, but the reflection luminance was evaluated using the part where there was no printed evaluation pattern. Further, in order to validate the linear transmittance of the isotropic light diffusion layer, a sample for the measurement of the linear transmittance including the highly transparent PET (Cosmoshine A4100 100 μm, manufactured by TOYOBO CO., LTD.) instead of the mirror-surface reflection plate was prepared, and the linear transmittance was measured as in the case of the anisotropic optical film (anisotropic light diffusion layer).

From the above, the data on the samples of Comparative Example 1 and Comparative Example 2 is shown in Table 3.

Comparative Example 3 and Comparative Example 4

Preparation was carried out in the same manner as in Example 1, except that the transparent adhesive layer e was used instead of the isotropic light diffusion layer in accordance with Table 3 were applied, and the film laminates of Comparative Examples 3 and 4 of two layers of anisotropic optical film/transparent adhesive layer were obtained.

Subsequently, the transparent adhesive layer e side of each film laminate of Comparative Examples 3 and 4 was bonded, after peeling off the PET film, to a smooth mirror-surface reflection plate (reflectance of about 90%). Further, after peeling off the PET film on the anisotropic light diffusion layer A or G side surface, in order to remove the influence of the surface smoothness of the anisotropic light diffusion layer, highly transparent PET (Cosmoshine A4100 100 μm, manufactured by TOYOBO CO., LTD.) was bonded, via the transparent adhesive layer e, on the surface thereof to prepare a sample for evaluating reflection luminance and a sample for evaluating blurring impression.

In order to evaluate the blurring impression, a sample whose part of the mirror-surface reflection plate is printed with the evaluation pattern in advance was used, but the reflection luminance was evaluated using the part where there was no printed evaluation pattern. Further, in order to validate the linear transmittance in the laminated state of the anisotropic light diffusion layer and the transparent adhesive layer, a sample for the measurement of the linear transmittance including the highly transparent PET (Cosmoshine A4100 100 μm, manufactured by TOYOBO CO., LTD.) instead of the mirror-surface reflection plate was prepared, and the linear transmittance was measured as in the case of the anisotropic optical film (anisotropic light diffusion layer).

From the above, data on the samples of Comparative Example 3 and Comparative Example 4 are shown in Table 3.

Comparative Example 5

Two PET-attached anisotropic light diffusion layers A were laminated after peeling off the PET film on the laminating surfaces of the two anisotropic light diffusion layers A, and a anisotropic optical film laminate of Example 5 with two layers of the anisotropic optical film (anisotropic light diffusion layer)/the anisotropic optical film (anisotropic light diffusion layer) was obtained.

Subsequently, one surface of the anisotropic light diffusion layer A of the anisotropic optical film laminate of Comparative Example 5 was bonded, via the transparent adhesive layer e, after peeling off the PET film, to a smooth mirror-surface reflection plate (reflectance of about 90%). Further, after peeling off the PET film on the other surface of the anisotropic light diffusion layer A of the anisotropic optical film laminate, in order to remove the influence of the surface smoothness of the anisotropic light diffusion layer, highly transparent PET (Cosmoshine A4100 100 μm, manufactured by TOYOBO CO., LTD.) was bonded, via the transparent adhesive layer e, on the surface thereof to prepare a sample for evaluating reflection luminance and a sample for evaluating blurring impression.

In order to evaluate the blurring impression, a sample whose part of the mirror-surface reflection plate is printed with the evaluation pattern in advance was used, but the reflection luminance was evaluated using the part where there was no printed evaluation pattern. Further, in order to validate the linear transmittance of the anisotropic optical film laminate, a sample for the measurement of the linear transmittance including the highly transparent PET (Cosmoshine A4100 100 μm, manufactured by TOYOBO CO., LTD.) instead of the mirror-surface reflection plate was prepared, and the linear transmittance was measured as in the case of the anisotropic optical film (anisotropic light diffusion layer).

From the above, data on the sample of Comparative Example 5 is shown in Table 3.

Comparative Example 6

Preparation was carried out in the same manner as in Example 1, except that the combinations of the anisotropic light diffusion layer and the isotropic light diffusion layer in Table 3 were applied, and the light diffusion film laminates of Comparative Example 6 of two layers of anisotropic optical film/isotropic light diffusion layer were obtained.

Subsequently, the isotropic light diffusion layer a side of each light diffusion film laminate of Comparative Example 6 was bonded, after peeling off the PET film, to a smooth mirror-surface reflection plate (reflectance of about 90%). Further, after peeling off the PET film on the anisotropic light diffusion layer H side surface, in order to remove the influence of the surface smoothness of the anisotropic light diffusion layer, highly transparent PET (Cosmoshine A4100 100 μm, manufactured by TOYOBO CO., LTD.) was bonded, via the transparent adhesive layer e, on the surface thereof to prepare a sample for evaluating reflection luminance and a sample for evaluating blurring impression.

In order to evaluate the blurring impression, a sample whose part of the mirror-surface reflection plate is printed with the evaluation pattern in advance was used, but the reflection luminance was evaluated using the part where there was no printed evaluation pattern. Further, in order to validate the linear transmittance in the laminated state of the anisotropic light diffusion layer and the isotropic light diffusion layer, a sample for the measurement of the linear transmittance including the highly transparent PET (Cosmoshine A4100 100 μm, manufactured by TOYOBO CO., LTD.) instead of the mirror-surface reflection plate was prepared, and the linear transmittance was measured as in the case of the anisotropic optical film (anisotropic light diffusion layer).

From the above, data on the sample of Comparative Example 6 is shown in Table 3.

TABLE 3

| | ANISOTROPIC LIGHT DIFFUSION LAYER OR ANISOTROPIC OPTICAL FILM LAMINATE | | ISOTROPIC LIGHT DIFFUSION OR TRANSPARENT ADHESIVE LAYER | | | LINEAR TRANSMITTANCE | |
|---|---|---|---|---|---|---|---|
| | TYPE | ANGLE OF SCATTERING CENTRAL AXIS | TYPE | HAZE VALUE | ARRANGEMENT | MINIMUM VALUE | MAXIMUM VALUE |
| EXAMPLE 1 | A | ABOUT 15° | a | 36% | FRONT SIDE | 2% | 19% |
| EXAMPLE 2 | A | ABOUT 15° | a | 36% | REFLECTIVE LAYER SIDE | 2% | 20% |
| EXAMPLE 3 | A | ABOUT 15° | b | 47% | REFLECTIVE LAYER SIDE | 2% | 11% |
| EXAMPLE 4 | A | ABOUT 15° | c | 75% | REFLECTIVE LAYER SIDE | 1% | 5% |
| EXAMPLE 5 | A | ABOUT 15° | d | 83% | REFLECTIVE LAYER SIDE | 1% | 4% |
| EXAMPLE 6 | B | ABOUT 25° | b | 47% | REFLECTIVE LAYER SIDE | 2% | 14% |
| EXAMPLE 7 | C | ABOUT 35° | b | 47% | REFLECTIVE LAYER SIDE | 2% | 16% |
| EXAMPLE 8 | D | ABOUT 8° | b | 47% | REFLECTIVE LAYER SIDE | 1% | 13% |
| EXAMPLE 9 | E | ABOUT 15° | b | 47% | REFLECTIVE LAYER SIDE | 1% | 16% |
| EXAMPLE 10 | F | ABOUT 15° | b | 47% | REFLECTIVE LAYER SIDE | 2% | 19% |
| COMPARATIVE EXAMPLE 1 | — | (NONE) | b | 47% | — | 24% | 27% |
| COMPARATIVE EXAMPLE 2 | — | (NONE) | d | 83% | — | 2% | 3% |
| COMPARATIVE EXAMPLE 3 | G | ABOUT 0° | e | 1% | REFLECTIVE LAYER SIDE | 4% | 21% |
| COMPARATIVE EXAMPLE 4 | A | ABOUT 15° | e | 1% | REFLECTIVE LAYER SIDE | 2% | 22% |
| COMPARATIVE EXAMPLE 5 | A | ABOUT 15° (2 LAYERS) | e | 1% | REFLECTIVE LAYER SIDE | 1% | 8% |
| COMPARATIVE EXAMPLE 6 | H | ABOUT 45° | a | 36% | REFLECTIVE LAYER SIDE | 6% | 34% |

<<Evaluation Method>>

The light diffusion film laminate, the isotropic light diffusion layer, the film laminate, and the anisotropic optical film laminate produced in Examples 1 to 10 and Comparative Examples 1 to 6 were evaluated in the following manner. The evaluation results are shown in Table 4 below.

The film thicknesses of the effective portions of the light diffusion film laminate, the isotropic light diffusion layer, the film laminate and the anisotropic optical film laminate produced in Examples 1 to 10 and Comparative Examples 1 to 6 were measured. The measurement was made on the effective portion in the state where the PET film is attached on each surface and the value obtained by subtracting the thickness of the PET film from the measured value was calculated.

<Measurement of Reflection Luminance>

The reflection luminance was measured as follows.

Using a goniophotometer manufactured by GENESIA, the reflection luminance of the sample for evaluating reflection luminance obtained in each Example was measured. Collimated light was radiated from the light source of the halogen lamp via a collimating lens at an incident angle of 30° with respect to the normal direction of the sample (incident angle=30°). For a sample including an anisotropic light diffusion layer, collimated light was radiated from an azimuth angle direction (opposite azimuth angle) different from the azimuth angle direction of the scattering central axis by 180°. For a sample not including an anisotropic light diffusion layer, the azimuth angle direction is not restricted. The detector was positioned in the normal direction of the sample and the reflection luminance was measured (measurement angle=0°). The reflection luminance of a standard white plate was measured beforehand at the same incident angle and measurement angle, and the reflection luminance gain was calculated by the following expression.

Reflection luminance gain=(reflection luminance of the sample÷reflection luminance of the standard white plate)×100

Blurring impression was evaluated by visual observation. The evaluation was made based on the average of the scores of five viewers (full score of each item is a grade of 5).

<Score Criteria of Evaluation Items>

The score criteria of the evaluation items in Table 4 shown below are as follows.

"Blurring Impression"

1 (poor) to 5 (good)

TABLE 4

| | CONFIGURATION OUTLINE OF SAMPLE | | | EVALUATION RESULTS | |
|---|---|---|---|---|---|
| | ANISOTROPIC LIGHT DIFFUSION LAYER OR ANISOTROPIC OPTICAL FILM LAMINATE | ISOTROPIC LIGHT DIFFUSION OR TRANSPARENT ADHESIVE LAYER | EFFECTIVE THICKNESS | REFLECTION BRIGHTNESS GAIN | BLURRING IMPRESSION |
| EXAMPLE 1 | A | a | ABOUT 75 μm | 13 | 2.6 |
| EXAMPLE 2 | A | a | ABOUT 75 μm | 15 | 4.2 |
| EXAMPLE 3 | A | b | ABOUT 75 μm | 22 | 4.4 |
| EXAMPLE 4 | A | c | ABOUT 75 μm | 24 | 4.4 |
| EXAMPLE 5 | A | d | ABOUT 90 μm | 17 | 2.4 |

TABLE 4-continued

| | CONFIGURATION OUTLINE OF SAMPLE | | | EVALUATION RESULTS | |
|---|---|---|---|---|---|
| | ANISOTROPIC LIGHT DIFFUSION LAYER OR ANISOTROPIC OPTICAL FILM LAMINATE | ISOTROPIC LIGHT DIFFUSION OR TRANSPARENT ADHESIVE LAYER | EFFECTIVE THICKNESS | REFLECTION BRIGHTNESS GAIN | BLURRING IMPRESSION |
| EXAMPLE 6 | B | b | ABOUT 75 μm | 20 | 4.4 |
| EXAMPLE 7 | C | b | ABOUT 75 μm | 17 | 4.4 |
| EXAMPLE 8 | D | b | ABOUT 75 μm | 19 | 4.6 |
| EXAMPLE 9 | E | b | ABOUT 75 μm | 26 | 4.6 |
| EXAMPLE 10 | F | b | ABOUT 75 μm | 28 | 4.6 |
| COMPARATIVE EXAMPLE 1 | — | b | ABOUT 25 μm | 4 | 5.0 |
| COMPARATIVE EXAMPLE 2 | — | d | ABOUT 40 μm | 7 | 2.6 |
| COMPARATIVE EXAMPLE 3 | G | e | ABOUT 75 μm | 7 | 4.6 |
| COMPARATIVE EXAMPLE 4 | A | e | ABOUT 75 μm | 9 | 4.0 |
| COMPARATIVE EXAMPLE 5 | A (2 LAYERS) | — | ABOUT 100 μm | 23 | 1.8 |
| COMPARATIVE EXAMPLE 6 | H | a | ABOUT 75 μm | 9 | 4.0 |

<<Evaluation Result>>

As shown in Examples 1 to 10, the reflection luminance gain of the present invention including a predetermined anisotropic light diffusion layer (anisotropic optical film) and an isotropic light diffusion layer was superior to those of Comparative Examples 1 to 4 and 6. Although Comparative Example 5 is excellent in the reflection luminance gain, the effective thickness is thick, whereby not only the size of the display device is increased, but also the blurring impression is insufficient. The results in the arrangements of Examples 2 to 10 are better in the reflection luminance gain, and furthermore Examples 3, 4, 6, 9, and 10 have high reflection luminance gain and a good visibility with less blurring impression.

In the present invention, a specific isotropic light diffusion layer as a diffusion medium having specific diffusion characteristics is combined with a specific anisotropic optical film, thereby compensating the diffusion function of the anisotropic optical film, so that it is probable that the above evaluation results have been obtained.

Therefore, when the light diffusion film laminate of Examples (particularly, Examples 3, 4, 6, 9, and 10) is included, for example, in a reflective display device, since the inhibition of the anisotropic effect of the anisotropic optical film (anisotropic light diffusion layer) can be minimized at the time of incidence of external light and emission of reflected light, image blurring is not likely to occur. It is probable that the reflection luminance at a predetermined observation position (for example, the front direction of the screen) can be increased without reducing the visibility not only from a predetermined observation position (for example, the front direction of the screen), but also from a position away from a predetermined observation position (for example, an oblique direction deviated from the front of the screen).

In the present embodiment, an example in which the light diffusion film laminate is applied to the reflective display device has been described. Specific examples of the reflective display device include personal devices such as a tablet terminal such as a smartphone, a wrist watch, a game machine, a notebook personal computer, and may include any device aiming at expanding the visibility of the individual. For this reason, the reflective display device of the present invention is different from, in its purpose, for example, a device (such as a projector screen) for widening the viewing angle so that a large number of people can see easily.

Although the preferred embodiments of the present invention have been described with reference to the drawings, the present invention is not limited to the above-described embodiments. That is, it is understood that other forms or various modifications that can be conceived by those skilled in the art within the scope of the invention described in the claims are also within the technical scope of the present invention.

REFERENCE SIGNS LIST

30 Light diffusion film laminate
100 Anisotropic light diffusion layer (anisotropic optical film)
200 Isotropic light diffusion layer
S Normal line

The invention claimed is:

1. A light diffusion film laminate for a reflective display device, the light diffusion film laminate having optical diffusibility that changes depending on an incident angle of light, and at least transmitting reflected light occurring when incident light is reflected by a reflective layer, the light diffusion film laminate comprising at least:
   an anisotropic light diffusion layer that has a scattering central axis and whose linear transmittance changes depending on an incident light angle of the light, the anisotropic light diffusion layer having a matrix region and a plurality of pillar structures, wherein an angle of the scattering central axis is in a range of +6° or more and +40° or less, or −40° or more and −6° or less with respect to a normal direction of the anisotropic light diffusion layer;
   an isotropic light diffusion layer disposed on one surface of the anisotropic light diffusion layer; and
   the isotropic light diffusion layer has a haze value of 40% or more and less than 80%.

2. The light diffusion film laminate for the reflective display device according to claim 1,
- wherein a maximum linear transmittance which is a linear transmittance at an incident light angle at which a linear transmittance of light incident into the anisotropic light diffusion layer is maximized is 15% or more and less than 90%,
- wherein a minimum linear transmittance which is a linear transmittance at an incident angle at which a linear transmittance of light incident into the anisotropic light diffusion layer is minimized is 10% or less, and
- wherein the anisotropic light diffusion layer is configured such that a diffuse transmittance of incident light increases as the linear transmittance decreases.

3. A reflective display device comprising the light diffusion film laminate for the reflective display device according to claim 2.

4. The reflective display device according to claim 3, wherein the light diffusion film laminate for the reflective display device includes the anisotropic light diffusion layer and the isotropic light diffusion layer in this order from a reflected light viewing side.

5. The light diffusion film laminate for a reflective display device,
- wherein a maximum linear transmittance which is a linear transmittance at an incident light angle at which a linear transmittance of light incident into the light diffusion film laminate according to claim 1 is maximized is 5% or more and less than 20%,
- wherein a minimum linear transmittance which is a linear transmittance at an incident angle at which a linear transmittance of light incident into the light diffusion film laminate is minimized is 2% or less, and
- wherein the anisotropic light diffusion layer of the light diffusion film laminate is configured such that a diffuse transmittance of incident light increases as the linear transmittance decreases.

6. A reflective display device comprising the light diffusion film laminate for the reflective display device according to claim 5.

7. The reflective display device according to claim 6, wherein the light diffusion film laminate for the reflective display device includes the anisotropic light diffusion layer and the isotropic light diffusion layer in this order from a reflected light viewing side.

8. The light diffusion film laminate for the reflective display device according to claim 1, wherein the plurality of pillar structures are oriented from one surface of the anisotropic light diffusion layer to the other surface of the anisotropic light diffusion layer, and an aspect ratio of an average long diameter to an average short diameter is less than 2.

9. A reflective display device comprising the light diffusion film laminate for the reflective display device according to claim 8.

10. The light diffusion film laminate for the reflective display device according to claim 1, wherein the plurality of pillar structures are oriented from one surface of the anisotropic light diffusion layer to the other surface of the anisotropic light diffusion layer, and an aspect ratio of an average long diameter to an average short diameter is 2 or more and less than 50.

11. A reflective display device comprising the light diffusion film laminate for the reflective display device according to claim 10.

12. A reflective display device comprising the light diffusion film laminate for the reflective display device according to claim 1.

13. The reflective display device according to claim 12, wherein the light diffusion film laminate for the reflective display device includes the anisotropic light diffusion layer and the isotropic light diffusion layer in this order from a reflected light viewing side.

14. The reflective display device including a polarization plate which is laminated on a surface of the anisotropic light diffusion layer according to claim 13, which surface is a reflected light viewing side.

15. The reflective display device according to claim 12, wherein the reflective display device is a reflective liquid crystal display device.

16. The reflective display device according to claim 12, wherein the light diffusion film laminate for the reflective display device includes the isotropic light diffusion layer and the anisotropic light diffusion layer in this order from a reflected light viewing side.

17. The reflective display device including a polarization plate which is laminated on a surface of the isotropic light diffusion layer according to claim 16, which surface is a reflected light viewing side.

* * * * *